(12) United States Patent
Motohashi

(10) Patent No.: US 10,885,684 B2
(45) Date of Patent: Jan. 5, 2021

(54) ESTIMATION RESULTS DISPLAY SYSTEM, ESTIMATION RESULTS DISPLAY METHOD, AND ESTIMATION RESULTS DISPLAY PROGRAM

(71) Applicant: NEC CORPORATION, Tokyo (JP)

(72) Inventor: Yousuke Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 475 days.

(21) Appl. No.: 15/521,265

(22) PCT Filed: Apr. 30, 2015

(86) PCT No.: PCT/JP2015/002297
§ 371 (c)(1),
(2) Date: Apr. 21, 2017

(87) PCT Pub. No.: WO2016/063433
PCT Pub. Date: Apr. 28, 2016

(65) Prior Publication Data
US 2017/0300346 A1    Oct. 19, 2017

(30) Foreign Application Priority Data
Oct. 21, 2014 (JP) .................................. 2014-214561

(51) Int. Cl.
*G06T 11/20* (2006.01)
*G06N 20/00* (2019.01)
(Continued)

(52) U.S. Cl.
CPC .......... *G06T 11/206* (2013.01); *G06F 3/0482* (2013.01); *G06F 3/04842* (2013.01);
(Continued)

(58) Field of Classification Search
CPC .......... G06F 9/453; G06F 8/38; G06F 3/0482; G06F 3/04842; G06F 3/0484;
(Continued)

(56) References Cited

U.S. PATENT DOCUMENTS

| 8,762,299 B1 * | 6/2014 | Breckenridge | ...... G06K 9/6227 706/12 |
| 2005/0096758 A1 * | 5/2005 | Takezawa | ............ G05B 13/048 700/44 |

(Continued)

FOREIGN PATENT DOCUMENTS

| JP | 2005/135287 A | 5/2005 |
| JP | 2013/191099 A | 9/2013 |

OTHER PUBLICATIONS

International Search Report and Written Opinion of ISA dated Jul. 21, 2015, in corresponding PCT International Application.

(Continued)

*Primary Examiner* — Nicholas Ulrich
(74) *Attorney, Agent, or Firm* — Finnegan, Henderson, Farabow, Garrett & Dunner, L.L.P.

(57) ABSTRACT

An estimation results display system capable of displaying an estimation result so that persons can intuitively recognize at a glance which learning model is selected when deriving the estimation result is provided. An input unit receives input of information associating an estimation result and information indicating a learning model used when deriving the estimation result. A display unit displays a graph that represents the estimation result by a symbol and in which a type of the symbol is changed depending on the learning model corresponding to the estimation result.

13 Claims, 14 Drawing Sheets

(51) Int. Cl.
  *G06F 8/38*       (2018.01)
  *G06F 16/901*     (2019.01)
  *G06F 3/0484*     (2013.01)
  *G06F 9/451*      (2018.01)
  *G06F 3/0482*     (2013.01)

(52) U.S. Cl.
  CPC ............... *G06F 8/38* (2013.01); *G06F 9/453* (2018.02); *G06F 16/9024* (2019.01); *G06N 20/00* (2019.01); *G06T 2200/24* (2013.01)

(58) Field of Classification Search
  CPC .. G06F 3/04847; G06F 9/451; G06F 16/9024; G06N 20/00; G06T 11/206; G06T 2200/24
  See application file for complete search history.

(56) References Cited

U.S. PATENT DOCUMENTS

| | | | |
|---|---|---|---|
| 2006/0189009 A1 | 8/2006 | Ahn et al. | |
| 2010/0162152 A1* | 6/2010 | Allyn | G06F 3/0481 715/767 |
| 2013/0187923 A1* | 7/2013 | Yoshimoto | G06T 11/206 345/440 |
| 2013/0187924 A1* | 7/2013 | Ogata | G06T 11/206 345/440 |
| 2014/0222741 A1 | 8/2014 | Eto et al. | |

OTHER PUBLICATIONS

European Official Communication dated May 24, 2019, issued by the European Patent Office in counterpart European Patent Application No. 15852221.9.

Ken Matsubara; "Ippo Susunda Kikai Gakushu IoT de Gekizo suru Data no Katsuyo Genba ni Shinto [Advanced machine learning-Utilizing data that is rapidly increasing with IoT Penetration into the site]", Nikkei Big Data, Jun. 10, 2014, pp. 1-8. Internet: URL:http://business.nikkeibp.co.jp/article/bigdata/20140604/266216.

Jake Vanderplas; "Scatter Plot With Tooltips-MPLD3: Bringing Matplotlib to the Browser" Apr. 16, 2014, XP055590194, pp. 1-2, URL:https://web.archive.org/web/20140416051026/https://mpld3.github.io/examples/scatter_tooleip.html [retrieved on May 20, 2019].

Sichun Wang; "Solving the Optimal Solution of Weight Vectors on GP-Decision Tree" Intelligent Computation Technology and Automation, 2009. IEEE, Piscataway, NJ, USA, Oct. 10, 2009, pp. 329-332, XP031547447, ISBN:978-0-7695-3804-4.

Extended European Search Report dated May 17, 2018, issued by the European Patent Office in counterpart European Patent Application No. 15852221.9.

* cited by examiner

FIG. 3

| ESTIMATION DATA IDENTIFIER | AIR TEMPERATURE (°C) | PRECIPITATION (mm/h) | WIND SPEED (m/s) | TIME |
|---|---|---|---|---|
| ID=1 | 21.1 | 0.0 | 0.5 | 09:00:00 |
| ID=2 | 20.5 | 0.1 | 0.3 | 10:00:00 |
| ID=3 | 19.8 | 0.1 | 0.8 | 11:00:00 |

FIG. 4

| ESTIMATION RESULT DATA IDENTIFIER | ESTIMATION DATA IDENTIFIER | ESTIMATION RESULT (CLEAN WATER USAGE ESTIMATED VALUE m³) | LEARNING MODEL | TIME |
|---|---|---|---|---|
| ID=a1 | ID=1 | 4.3 | LEARNING MODEL 1 | 09:00:00 |
| ID=a2 | ID=2 | 4.0 | LEARNING MODEL 1 | 10:00:00 |
| ID=a3 | ID=3 | 4.7 | LEARNING MODEL 3 | 11:00:00 |

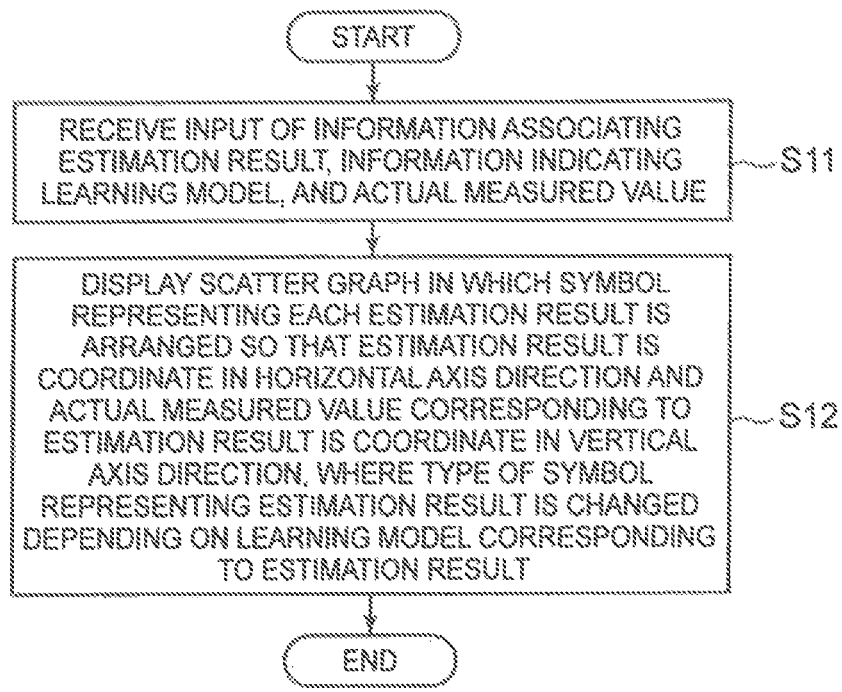
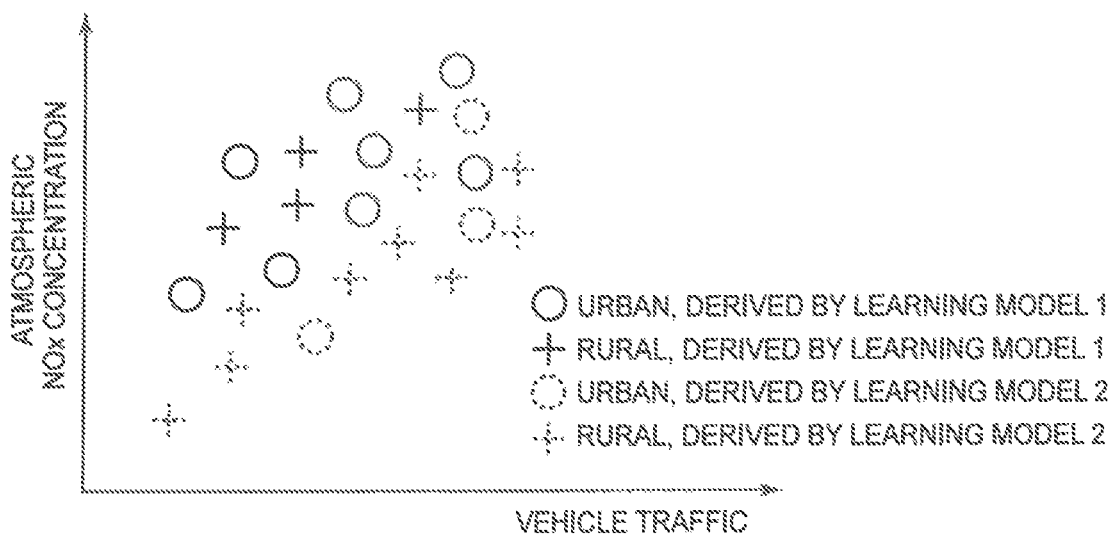

ESTIMATION RESULTS DISPLAY SYSTEM, ESTIMATION RESULTS DISPLAY METHOD, AND ESTIMATION RESULTS DISPLAY PROGRAM

CROSS-REFERENCE TO RELATED PATENT APPLICATIONS

This application is a National Stage Entry of international Application No. PCT/JP2015/002297, filed Apr. 30, 2015, which claims priority from Japanese Patent Application No. 2014-214561, filed Oct. 21, 2014. The entire contents of the above-referenced applications are expressly incorporated herein by reference.

TECHNICAL FIELD

The present invention relates to an estimation results display system, estimation results display method, and estimation results display program for displaying an estimation result derived using a learning model.

BACKGROUND ART

Non Patent Literature (NPL) 1 describes automatically selecting a prediction expression from a plurality of prediction expressions and calculating a predicted value using the prediction expression. NPL 1 also describes displaying a graph representing the changes of the calculated predicted value and the changes of the actual value corresponding to the predicted value. NPL 1 further describes displaying a graph representing the changes of the selected prediction expression.

CITATION LIST

Non Patent Literature

NPL 1: "Machine learning one step further: penetration into fields utilizing data burgeoning through IoT" (Ippo susunda kikai gakushu: IoT de gekizou sura deta no katsuyougenba ni shinton), Nikkei Business Publications. Inc., "Nikkei Big Data", 2014, No. 6, p. 7-12

SUMMARY OF INVENTION

Technical Problem

As mentioned above, NPL 1 shows an example of a display screen displaying the graph representing the changes of the predicted value and the graph representing the changes of the selected prediction express ion in separate regions.

When deriving an estimation result such as a predicted value as disclosed in NPL 1 as an example, there is a case where a learning model is automatically selected from a plurality of learning models and an estimation result is derived using the learning model. The present inventor considered that, in such a case, it is preferable to display the estimation result so that persons can intuitively recognize at a glance which learning model is selected when deriving the estimation result.

The present inventor also considered that, in such a case where a learning model with low estimation accuracy is selected when deriving an estimation result, it is preferable to display the estimation result so that persons can intuitively recognize at a glance the selected learning model with low estimation accuracy.

The present invention accordingly has an object, of providing an estimation results display system, estimation results display method, and estimation results display program capable of displaying an estimation result so that persons can intuitively recognize at a glance which learning model is selected when deriving the estimation result.

The present invention also has an object of providing an estimation results display system, estimation results display method, and estimation results display program capable of displaying, in such a case where a learning model with low estimation accuracy is selected when deriving an estimation result, the estimation result so that persons can intuitively recognize at a glance the selected learning model with low estimation accuracy.

Solution to Problem

An estimation results display system according to the present invention includes: input means for receiving input of information associating an estimation result and information indicating a teandng model used when deriving the estimation result; and display means for displaying a graph that represents the estimation result by a symbol and in which a type of the symbol is changed depending on the learning model corresponding to the estimation result.

An estimation results display system according to the present invention includes: input means for receiving input of information associating an estimation result and information indicating a learning model used when deriving the estimation result; and display means for displaying a graph that represents the estimation result by a symbol and, in the case where any symbol in the graph is selected, displaying information indicating a learning model corresponding to an estimation result represented by the selected symbol.

An estimation results display system according to the present invention includes: input means for receiving input of information associating an estimation result and information indicating a learning model used when deriving the estimation result; and display means for displaying a graph in which a symbol representing the estimation result is arranged in predetermined order, a region in the graph being divided depending on the learning model corresponding to the estimation result represented by the symbol.

An estimation results display system according to the present invention includes: input means for receiving input of information associating an estimation result and information indicating a learning model used when deriving the estimation result; and display means for displaying a line graph that represents a change of the estimation result and in which an attribute of a line is changed depending on the learning model corresponding to the estimation result.

An estimation results display method according to the present invention includes: receiving input of information associating an estimation result and information indicating a learning model used when deriving the estimation result; and displaying a graph that represents the estimation result by a symbol and in which a type of the symbol is changed depending on the learning model corresponding to the estimation result.

An estimation results display method according to the present invention includes: receiving input of information associating an estimation result and information indicating a learning model used when deriving the estimation result; and displaying a graph that represents the estimation result by a symbol and, in the ease where any symbol in the graph is selected, displaying information indicating a learning model corresponding to an estimation result represented by the selected symbol.

An estimation results display method according to the present invention includes: receiving input of information associating an estimation result and information indicating a learning model used when deriving the estimation result; and displaying a graph in which a symbol representing the estimation result is arranged in predetermined order, a region in the graph being divided depending on the learning model corresponding to the estimation result represented by the symbol.

An estimation results display method according to the present invention includes: receiving input of information associating an estimation result and information indicating a learning model used when deriving the estimation result; and displaying a line graph that represents a change of the estimation result and in which an attribute of a line is changed depending on the learning model corresponding to the estimation result.

An estimation results display program according to the present invention is an estimation results display program pro vided in a computer including input means for receiving input of information associating an estimation result and information indicating a learning model used when deriving the estimation result, the estimation results display program causing the computer to execute a display process of displaying a graph that represents the estimation result by a symbol and in which a type of the symbol is changed depending on the learning model corresponding to the estimation result.

An estimation results display program according to the present invention is an estimation results display program provided in a computer including input means for receiving input of information associating an estimation result and information indicating a learning model used when deriving the estimation result the estimation results display program causing the computer to execute a display process of displaying a graph that represents the estimation result by a symbol and, in the ease where any symbol in the graph is selected, displaying information indicating a learning model corresponding to an estimation result represented by the selected symbol.

An estimation results display program according to the present invention is an estimation results display program provided in a computer including input means for receiving input of information associating an estimation result and information indicating a learning model used when deriving the estimation result, the estimation results display program causing the computer to execute a display process of displaying a graph in which a symbol representing the estimation result is arranged in predetermined order, a region in the graph being divided depending on the learning model corresponding to the estimation result represented by the symbol.

An estimation results display program according to the present invention is as estimation results display program provided in a computer including input means for receiving input of information associating an estimation result and information indicating a learning model used when deriving the estimation result, the estimation results display program causing the computer to execute a display process of displaying a line graph that represents a change of the estimation result and in which an attribute of a line is changed depending on the learning model corresponding to the estimation result.

Advantageous Effects of Invention

According to the present invention, it is possible to display an estimation result so that persons can intuitively recognize at a glance which learning model is selected when deriving the estimation result.

According to the present invention, it is also possible to display, in such a case where a learning model with low estimation accuracy is selected when deriving an estimation result, the estimation result so that persons cars intuitively recognize at a glance the selected learning model with low estimation accuracy.

BRIEF DESCRIPTION OF DRAWINGS

FIG. 3 is a diagram depicting an example of estimation data.

FIG. 4 is a diagram depicting an example of information output by the estimator.

FIG. 9 is a flowchart depicting an example of a process in Exemplary Embodiment 2.

FIG. 10 is a schematic diagram depicting an example of a graph displayed by display means in Exemplary Embodiment 3.

DESCRIPTION OF EMBODIMENT

The following describes exemplary embodiments of the present invention with reference to drawings.

Figure 1:
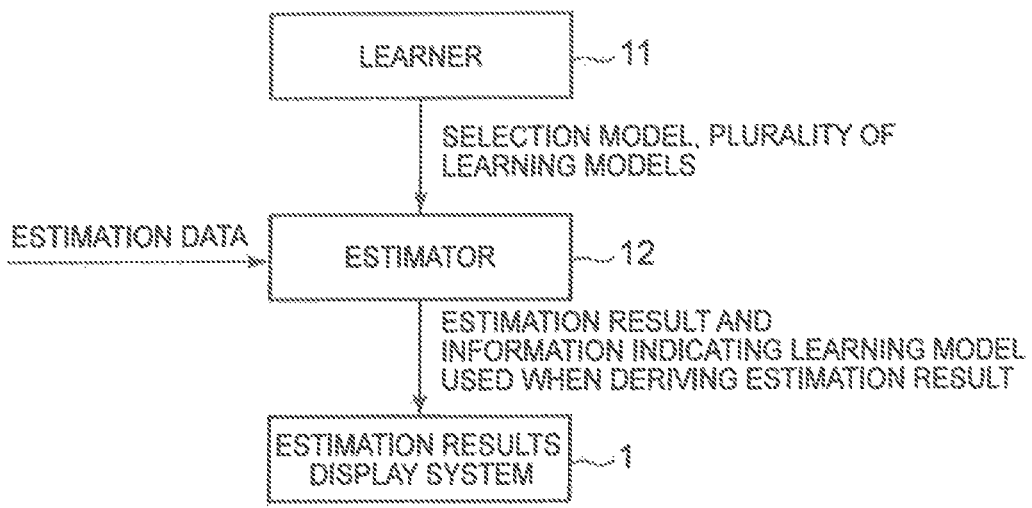
FIG. 1 is a schematic diagram depicting a learner and an estimator.

A learner and an estimator are described first, in relation to an estimation results display system according to the present invention. FIG. 1 is a schematic diagram depicting a learner and an estimator. The following uses a specific example of estimating (predicting) the value of an objective variable, that is, clean water usage, based on the values of explanatory variables such as air temperature, precipitation, and wind speed, to facilitate understanding.

A learner 11 generates a plurality of learning models using learning data beforehand. Each learning model is a model for deriving an estimation result when estimation data is given. In other words, the estimation result is obtained by applying the learning model to foe estimation data. The learning model is, for example, information indicating regularity between an explanatory variable and an objective variable, which is derived from learning data. For example, the learning model is generated in the form of an estimation expression. In this ease, the estimation result is calculated by assigning the estimation data to the explanatory variable of the estimation expression. Although an example where the learning model is in the form of an estimation expression is described here, the form of the learning model is not limited to an estimation expression. The plurality of learning models generated by the learner 11 are used in an estimator 12.

The estimator 12 receives input of estimation data, and selects a learning model corresponding to a condition satisfied by the estimation data from among the plurality of learning models. The estimator 12 then derives an estimation result using the estimation data and the selected learning model. In the case where the learning model is in the form of an estimation expression as in this example, the estimator 12 can calculate the estimation result by assigning the input estimation data to the explanatory variable of the estimation expression.

An estimation results display system 1 according to the present invention receives input of a plurality of tuples of information associating an estimation result derived by the estimator 12 and information indicating a learning model used when deriving the estimation result. The information indicating the learning model is the identification information of the learning model. The estimation results display system 1 also receives input of other information in association with the estimation result and the information indicating the learning model, in some exemplary embodiments. Each estimation result input to the estimation results display system 1 according to the present invention is derived by the estimator 12 beforehand.

Figure 2:
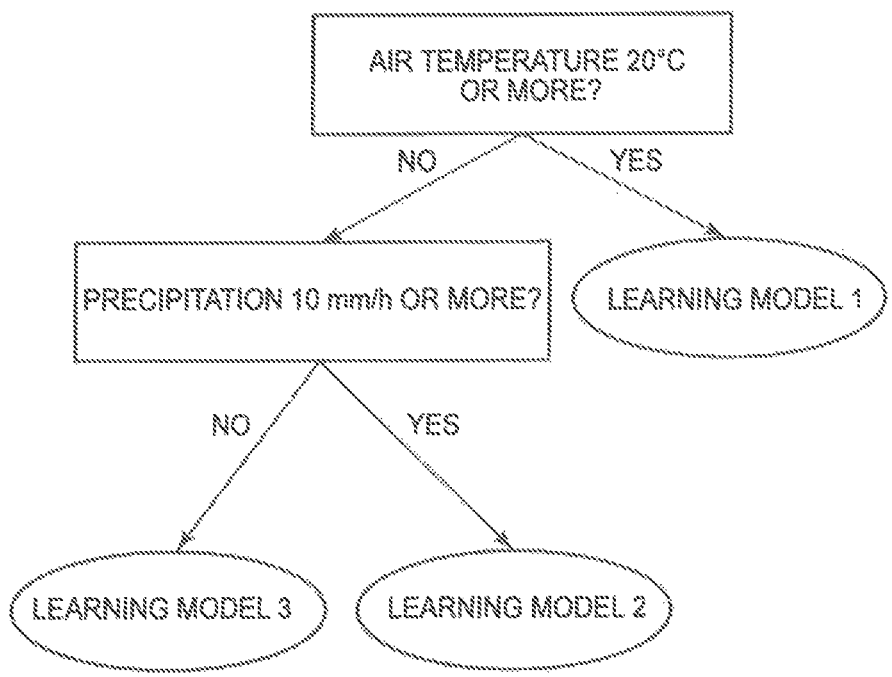
FIG. 2 is a schematic diagram depicting an example of a selection model.

The estimator 12 selects a learning model corresponding to estimation data. The learner 11 accordingly generates a model (hereafter referred to as "selection model") for selecting a learning model corresponding to estimation data. FIG. 2 is a schematic diagram depicting an example of the selection model. In the example depicted in FIG. 2, the selection model is a tree structure model in which each leaf node is a learning model and each node other than the leaf nodes is a condition relating to estimation data. In the selection model depicted in FIG. 2, each node other than the leaf nodes has two child nodes. Although an example where the selection model is a tree structure model as depicted in FIG. 2 is described here, the form of the selection model is not limited to a tree structure model.

The estimator 12 is also provided with the selection model. Suppose the selection model depicted in FIG. 2 is provided to the estimator 12, and the values of air temperature and precipitation are input to the estimator 12 as estimation data. Starting at the root node of the selection model, the estimator 12 advances through nodes while repeatedly selecting one of two child nodes depending on whether or not the estimation data satisfies the condition indicated by the node. When the estimator 12 reaches a leaf node, the estimator 12 selects a learning model indicated by the leaf node. The estimator 12 then derives an estimation result using the learning model and the estimation data. Although the above describes an example where the values of air temperature and precipitation set as conditions in the selection model depicted in FIG. 2 are input as the estimation data, the estimation data may include any item not set as a condition in the selection model.

The estimator 12 is described using a specific example below, to facilitate understanding. FIG. 3 is a diagram depicting a specific example of estimation data input to the estimator 12. An estimation data set is depicted in FIG. 3. Information of each "row" in FIG. 3 is information corresponding to a tuple of estimation data. For example, the estimation data includes a plurality of attributes. Information of each "column" in FIG. 3 is information indicating an attribute included in the estimation data. In the example depicted in FIG. 3, the estimation data includes an ID (identifier) for identifying the estimation data, an air temperature value, a precipitation value, a wind speed value, and information indicating time. Although the estimation data set is in tabular form in FIG. 3, the estimation data is not limited to the form in FIG. 3.

The estimator 12 calculates an estimation result by, for example, assigning each attribute value included in the estimation data to an explanatory variable of an estimation expression.

An example of the operation of the estimator 12 is described below, based on the estimation data depicted in FIG. 3 and the selection model depicted in FIG. 2. The estimator 12 receives input of the estimation data identified by ID=1 in FIG. 3. The estimator 12 references to the selection model in FIG. 2. In the estimation data identified by ID=1, the air temperature value is 21.1° C. The estimator 12 accordingly selects a learning model 1 as the learning model corresponding to the estimation data identified by ID=1, using the selection model in FIG. 2. Likewise, the estimator 12 receives input of the estimation data identified by ID=2 in FIG. 3. In the estimation data identified by ID=2, the air temperature value is 20.5° C. The estimator 12 accordingly selects the learning model 1 as the learning model corresponding to the estimation data identified by ID=2, using the selection model in FIG. 2. Likewise, the estimator 12 receives input of the estimation data identified by ID=3 in FIG. 3. In the estimation data identified by ID=3, the air temperature value is 19.8° C., and the precipitation is 0.1 mm/h. The estimator 12 accordingly selects a learning model 3 as the learning model corresponding to the estimation data identified by ID=3, using the selection model in FIG. 2.

The estimator 12 derives an estimation result using the estimation data and the selected teandng model. In detail, the estimator 12 calculates an estimated value by assigning the estimation data identified by ID=1 to the estimation expression corresponding to the learning model 1. Likewise, the estimator 12 calculates an estimated value by assigning the estimation data identified by ID=2 to the estimation expression corresponding to the learning model 1. Likewise, the estimator 12 calculates an estimated value by assigning the estimation data identified by ID=3 to the estimation expression corresponding to the learning model 3. In other words, for example for a set of estimation data continuous in chronological order (i.e. a series of estimation data in chronological order), the estimator 12 selects a learning model to be applied to the estimation data based on the property of the estimation data and the selection model. The property of the estimation data is, for example, each attribute value included in the estimation data.

FIG. 4 is a diagram depicting a specific example of estimation result data which is information output by the estimator 12. An estimation result data set is depicted in FIG. 4. Information of each "row" in FIG. 4 is information corresponding to a tuple of estimation result data. As depicted in FIG. 4, the estimation result data is, for example, information associating an estimated value and information indicating a learning model used when deriving the estimated value. The estimation result data may include other information, as depicted in FIG. 4. In the example depicted in FIG. 4, the estimation result data also includes an identifier for identifying the estimation result data, the identifier of the estimation data based on which the estimated value is calculated, the time information of the estimation data, etc. The estimation result data may also include any attribute value included in the estimation data based on which the estimated value is calculated.

The estimation result (i.e. clean water usage estimated value 4.3 m$^3$) identified by ID=a1 in FIG. 4 is the estimated value calculated by assigning the estimation data identified by ID=1 to the estimation expression corresponding to the teandng model 1. Likewise, the estimation result (i.e. clean water usage estimated value 4.0 m$^3$) identified by ID=a2 in FIG. 4 is the estimated value calculated by assigning the estimation date identified by ID=2 to the estimation expression corresponding to the learning model 1. Likewise, the estimation result (i.e. clean water usage estimated value 4.7 m$^3$) identified by ID=a3 in FIG. 4 is the estimated value calculated by assigning the estimation data identified by ID=3 to the estimation expression corresponding to the learning model 3. Thus, the estimation result data set is, for example, information indicating a series of estimation results continuous in chronological order. This completes the description of the operation of the estimator 12 using a specific example.

An example of the learner 11 as depicted in FIG. 2 is disclosed in the following reference literature.

REFERENCE LITERATURE the specification of US Patent Application Publication No. 2014/0222741 A1

In some cases, the aforementioned selection model is referred to as "learning model" and a model for deriving an estimation result, such as an estimation expression, as "component". In the following exemplary embodiments, however, a model (e.g. estimation expression) for deriving an estimation result is referred to as "learning model", and a model for selecting a learning model as "selection model". While the selection model itself is a learning result in the technique disclosed in the reference literature, the selection model may be a teandng result or information generated manually in the exemplary embodiments of the present invention.

Exemplary Embodiment 1

Figure 5:
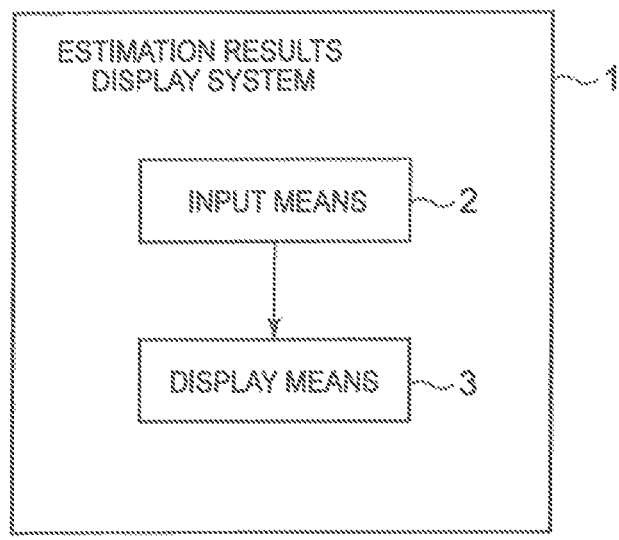
FIG. 5 is a block diagram depicting an example of the structure of an estimation results display system in Exemplary Embodiment 1 of the present invention.

FIG. 5 is a block diagram depicting an example of the structure of an estimation results display system in Exemplary Embodiment 1 of the present invention. An estimation results display system 1 in this exemplary embodiment includes input means 2 and display means 3.

The input means 2 receives input of a plurality of tuples of information (i.e. estimation result data) associating an estimation result and information indicating a learning model used when deriving the estimation result. In other words, the input means 2 receives an estimation result data set. The estimation result included in each tuple of estimation result data is derived by the estimator 12 (see FIG. 1) beforehand. The learning model used when deriving the estimation result is, for example, selected by foe estimator 12. Exemplary Embodiment 1 describes an example where the estimation result is calculated as a value. Hence, the estimation result may also be referred to as "estimated value".

In each individual tuple of estimation result data, the estimation result and the information indicating the learning model (i.e. the identification information of the learning model) are associated with each other, as mentioned, above. This means the estimation result is associated with the learning model itself.

The input means 2 sends the input information to the display means 3.

The input means 2 is realized by, for example, an input device or input interface for inputting information.

The display means 3 displays a graph representing each estimation result by a symbol, where the type of the symbol is changed depending on the learning model corresponding to the estimation result. The symbol is also referred to as "marker".

Figure 6:
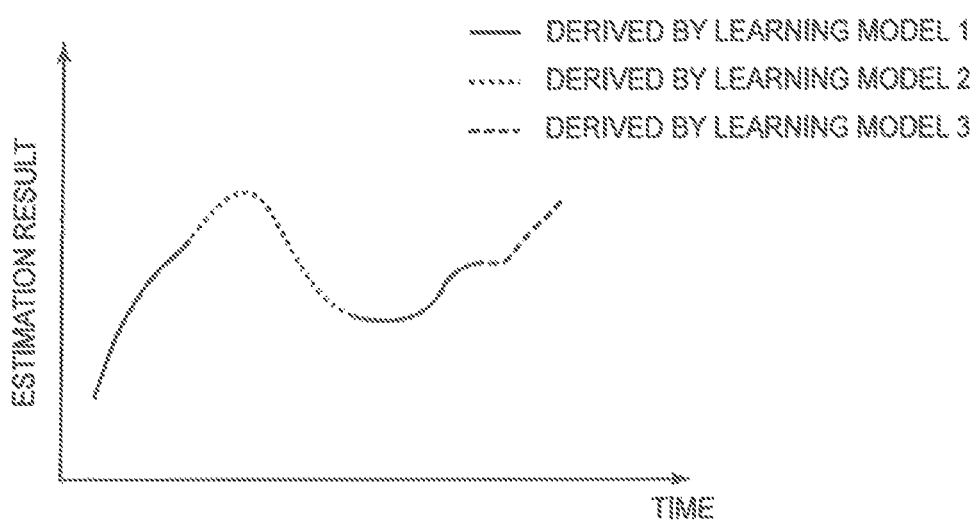
FIG. 6 is a schematic diagram depicting an example of a graph displayed by display means in Exemplary Embodiment 1.

FIG. 6 is a schematic diagram depicting an example of the graph displayed by the display means 3 in Exemplary Embodiment 1. The horizontal axis of the graph displayed in this exemplary embodiment is an axis representing foe order of foe estimation results. FIG. 6 depicts an example where the horizontal axis of the graph represents time. In this case, each estimation result input to the input means 2 may be accompanied with the corresponding time information. Alternatively, each pair (i.e. estimation result data) of an estimation result and information indicating a learning model may be input to the input means 2 in order of the time corresponding to the estimation result.

The horizontal axis of the graph need not necessarily be an axis representing time, and may be, for example, an axis representing the estimation result data input order.

The vertical axis of the graph is an axis corresponding to the estimation result.

The display means 3 displays the graph in which the symbol representing each estimation result is arranged in predetermined order (in order of the time corresponding to the estimation result in this example). In more detail, the display means 3 arranges the symbol representing each estimation result in predetermined order (in order of dm time corresponding to foe estimation result in this example) along the horizontal axis, and sets the estimation result calculated as a value to be a coordinate in the vertical axis direction in the graph. In other words, dm display means 3 places the symbol representing each estimation result at the position at which the ordinal position (e.g. the ordinal position indicated by time) of the estimation result is an x coordinate (coordinate in the horizontal axis direction) and the estimation result is a y coordinate (coordinate in the vertical axis direction). The graph displayed in tins way can be recognized as a line graph if the interval between symbols arranged in order is short. FIG. 6 depicts an example where the graph is recognized as a line graph as the interval between symbols arranged in order is short.

Moreover, the display means 3 changes the type of the symbol representing the estimation result, depending on the learning model corresponding to the estimation result. In detail, the display means 3 arranges different symbols in the graph, as a symbol representing an estimation result derived using the learning model 1, a symbol representing an estimation result derived using the learning model 2, a symbol representing an estimation result derived using the learning model 3, etc. The same applies to the case where mom types of learning models are selected in estimation result derivation.

In the ease of changing the type of the symbol depending on the type of the learning model, the display means 3 may change, for example, the color of the symbol or the shape of the symbol. How the type of the symbol is changed Is not particularly limited.

By displaying the symbols in this way, the observer of the graph depicted in FIG. 6 can intuitively recognize at a glance Which learning model is selected when deriving the estimation result at each individual time.

The display means 3 is realized by a CPU of a computer including a display device. In this case, the CPU may, for example, read an estimation results display program from a program recording medium such as a program storage device (not depicted in FIG. 5) in the computer, and operate as the display means 3 according to the estimation results display program. The part of the display means 3 that determines the graph and causes the display device to display the graph is realized by the CPU. The part of the display means 3 that performs actual display is realized by the display device. The same applies to the exemplary embodiments described later.

The estimation results display system 1 may have a structure in which two or more physically separate devices are connected wiredly or wirelessly. The same applies to the exemplary embodiments described later.

Figure 7:
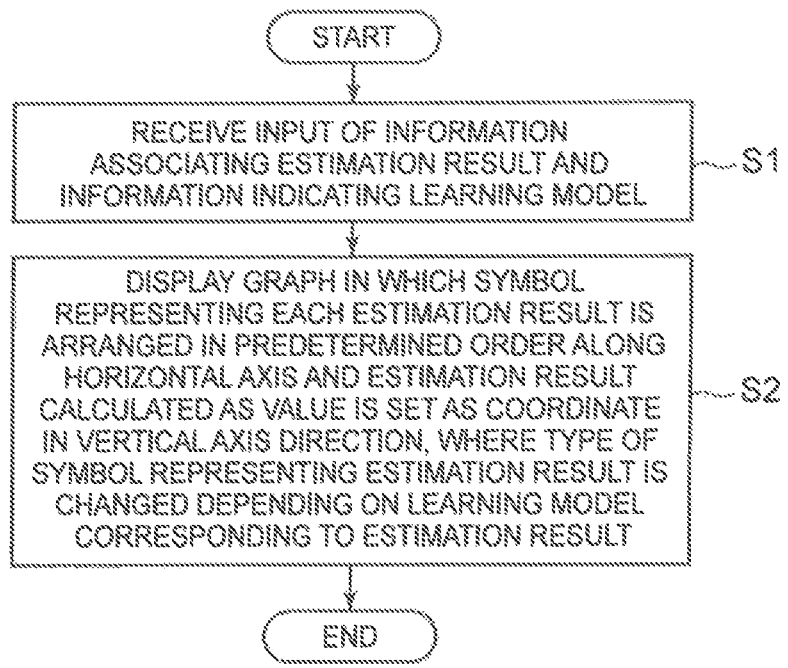
FIG. 7 is a flowchart depicting an example of a process in Exemplary Embodiment 1.

A process is described below. FIG. 7 is a flowchart depicting an example of the process in Exemplary Embodiment 1.

First, the input means 2 receives input of a plurality of tuples of information associating an estimation result and information indicating a learning model used when deriving the estimation result. The input means 2 sends the input information to the display means 3 (step S1).

The display means 3 displays a graph hi which a symbol representing each estimation result is arranged in predetermined order along the horizontal axis and the estimation result calculated as a value is set as a coordinate is the vertical axis direction, where the type of the symbol representing the estimation result is changed depending on the learning model corresponding to the estimation result (step S2). For example, the display means 3 displays the graph depleted in FIG. 6. The "predetermined order" may be the order of time corresponding to the estimation result, the estimation result input order, or other order.

According to this exemplary embodiment, the display means 3 changes the type of the symbol representing the estimation result depending on the learning model corresponding to the estimation result. This enables the observer of the graph to intuitively recognize at a glance which learning model is selected when deriving the estimation result represented by the symbol.

In the graph described in NPL 1, the graph representing the predicted value and the graph representing the changes of the prediction expression are displayed side-by-side. In the present invention, on the other hand, the observer of the graph can recognize, from one graph, which learning model is selected when deriving the estimation result represented by the symbol.

In the information input to the input means 2, the learning model corresponding to the estimation data may not necessarily be the learning model selected by the estimator 12. For example, the learning model corresponding to the estimation date may be manually selected by an analyzer. In this case, for example, the estimation result and the information indicating the learning model used when deriving the estimation result may be associated manually. The same applies to the other exemplary embodiments.

In the case where many types of learning models are used, the display means 3 need not necessarily change the type of the symbol for every learning model. For example, the display means 3 may group the learning models and, for each learning model group, change the type of the symbol representing an estimation result derived from any learning model in the learning model group. The display means 3 may also change the type of the symbol representing an estimation result derived Iron a specific learning model from among a plurality of learning models, from the other types of symbols. The same applies to the other exemplary embodiments.

Exemplary Embodiment 2

An estimation results display system in Exemplary Embodiment 2 of the present invention can be depicted by the block diagram in FIG. 5, as with the estimation results display system in Exemplary Embodiment 1. Hence, Exemplary Embodiment 2 is described below with reference to FIG. 5. The description of the same matters as in Exemplary Embodiment 1 is omitted as appropriate.

The estimation results display system 1 in Exemplary Embodiment 2 includes the input means 2 and the display means 3 (see FIG. 5).

In Exemplary Embodiment 2, the estimation result data received by the input means 2 includes an actual measured value corresponding to the estimation result. In other words, the input means 2 receives input of a plurality of tuples of information (estimation result data) associating an estimation result, information indicating a learning model used when deriving the estimation result, and an actual measured value corresponding to the estimation result. The input means 2 sends the input information to the display means 3. Exemplary Embodiment 2 describes an example where the estimation result is calculated as a value. Hence, the estimation result may also be referred to as "estimated value".

The display means 3 displays a graph representing each estimation result by a symbol, where the type of the symbol is changed depending on the learning model corresponding to the estimation result. The display means 3 represents one tuple of estimation result data by one symbol. This is referred to as "representing an estimation result by a symbol".

Figure 8:
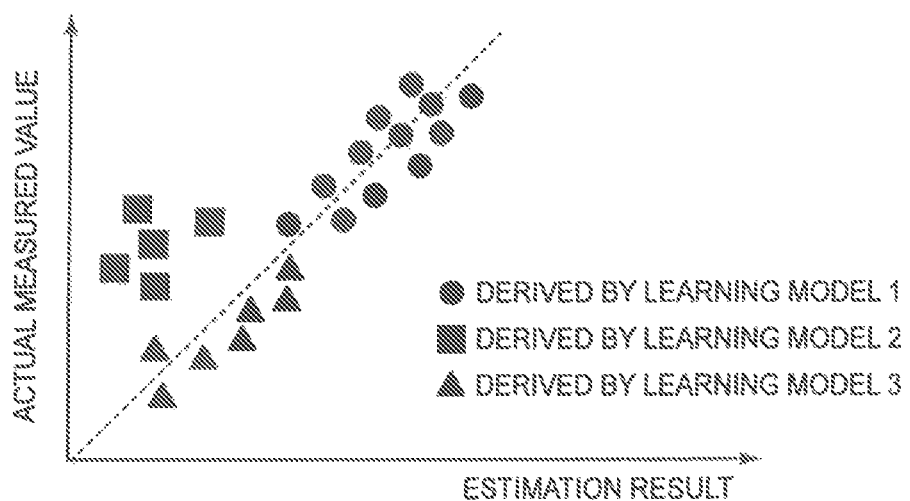
FIG. 8 is a schematic diagram depicting an example of a graph displayed by display means in Exemplary Embodiment 2.

FIG. 8 is a schematic diagram depicting an example of the graph displayed by the display means 3 in Exemplary Embodiment 2. As depicted in FIG. 8, the display means 3 displays a scatter graph representing each estimation result by a symbol. The scatter graph displayed in Exemplary Embodiment 2 has an axis corresponding to the estimation result and an axis corresponding to the actual measured value. FIG. 8 depicts an example where the axis corresponding to the estimation result is the horizontal axis and the axis corresponding to the actual measured value is the vertical axis.

The display means 3 places the symbol representing each estimation result in the scatter graph so that the estimation result is a coordinate in the horizontal axis direction and the actual measured value corresponding to the estimation result is a coordinate in the vertical axis direction. Moreover, the display means 3 changes the type of the symbol representing the estimation result, depending on the learning model corresponding to the estimation result. FIG. 8 depicts an example where the symbol representing an estimation result derived using the learning model 1 is a circle, the symbol representing an estimation result derived using the learning model 2 is a square, and the symbol representing an estimation result derived using the learning model 3 is an equilateral triangle. In the case where more types of learning models are selected in estimation result derivation, too, the display means 3 changes the type of the symbol depending on the learning model.

Although FIG. 8 depicts an example where the display means 3 changes the shape of the symbol depending on the learning model, the display means 3 may, for example, change the color of the symbol. How the type of the symbol is changed is not particularly limited.

A process is described below. FIG. 9 is a flowchart depicting an example of the process in Exemplary Embodiment 2.

First, the input means 2 receives input of a plurality of tuples of information associating an estimation result, information indicating a learning model used when deriving the estimation result, and an actual measured value. The input means 2 sends the input information to the display means 3 (step S11).

The display means 3 displays a scatter graph in which a symbol representing each estimation result is arranged so that the estimation result is a coordinate in the horizontal axis direction and the actual measured value corresponding to the estimation result is a coordinate in the vertical axis direction, where the type of the symbol representing the estimation result is changed depending on the learning model corresponding to the estimation result (step S12). For example, the display means 3 displays the graph depicted in FIG. 8.

According to this exemplary embodiment, the display means 3 displays the scatter graph having the horizontal axis corresponding to the estimation result and the vertical axis corresponding to the actual measured value, as depicted in FIG. 8. Here, the display means 3 places the symbol representing each estimation result in the scatter graph so that the estimation result is a coordinate in the horizontal axis direction and the actual measured value corresponding to the estimation result is a coordinate in the vertical axis direction, where the type of the symbol representing the estimation result is changed depending on the learning model corresponding to the estimation result. Let x be the estimation result, and y be the actual measured value. When the symbol is closer to the straight line y=x (the dashed straight line in FIG. 8), the estimation accuracy of the learning model is higher. This means that, if a specific type of symbol is away from y=x, the estimation accuracy of the learning model selected when deriving the estimation result represented by the symbol is low. In the example depicted in FIG. 8, the estimation result derived using the learning model 2 is represented by the square symbol. The square symbol is away from the straight line y=x, as compared with the other symbols. Therefore, the observer of the graph (scatter graph) in FIG. 8 can intuitively determine at a glance that the estimation accuracy of the learning model 2 is relatively low. Thus, according to this exemplary embodiment, in the case where a learning model with low estimation accuracy is selected when deriving an estimation result, persons can intuitively recognize at a glance the selected learning model with low estimation accuracy.

The observer of the graph (scatter graph) in FIG. 8 can also intuitively determine at a glance the tendency of each learning model. For example, the observer can recognize at a glance that the learning model 2 tends to derive a small estimated value with respect to an actual measured value and the learning model 3 tends to derive a large estimated value with respect to an actual measured value in FIG. 8.

In Exemplary Embodiment 2, too, the display means 3 changes the type of the symbol representing the estimation result depending on the learning model corresponding to the estimation result. This enables the observer of the scatter graph to intuitively recognize at a glance which learning model is selected when deriving the estimation result represented by the symbol in the scatter graph, from one scatter graph.

In Exemplary Embodiment 2, the scatter graph may have the axis corresponding to the actual measured value as the horizontal axis and the axis corresponding to the estimation result as the vertical axis.

Exemplary Embodiment 3

An estimation results display system in Exemplary Embodiment 3 of the present invention can be depicted by the block diagram in FIG. 5, as with the estimation results display system in Exemplary Embodiment 1. Hence, Exemplary Embodiment 3 is described below with reference to FIG. 5. The description of the same matters as in Exemplary Embodiment 1 is omitted as appropriate.

The estimation results display system 1 in Exemplary Embodiment 3 includes the input means 2 and the display means 3 (see FIG. 5).

In Exemplary Embodiment 3, the estimation result data received by the input means 2 includes the values of two or more types of attributes used when deriving the estimation result. In other words, the input means 2 receives input of a plurality of tuples of information (estimation result data) associating an estimation result, information indicating a learning model used when deriving the estimation result, and two or more types of attribute values used when deriving the estimation result. In Exemplary Embodiment 3, the estimation result is derived based on at least two types of attributes. While the attribute values included in each tuple of estimation result data may be different, the types of the attributes included in each tuple of estimation result data are the same. For example, in the case where an air temperature measured value and a precipitation measured value are included in estimation result data, these measured values may be different between different tuples of estimation result data, but each tuple of estimation result data includes an air temperature measured value and a precipitation measured value.

Exemplary Embodiment 3 describes an example where a determination result is obtained as the estimation result. Hence, in this exemplary embodiment, the estimation result may also be referred to as "determination result". In the following description, it is assumed that the estimator 12 (see FIG. 1) selects a learning model using, as attribute values, a vehicle traffic measured value and an atmospheric NOx concentration measured value. An example where the estimator 12 estimates (determines) whether the traffic and NOx concentration measurement point is "urban" or "rural" based on the vehicle traffic measured value, the atmospheric NOx concentration measured value, and the selected learning model is used below. The estimation result may be obtained based on at least one other attribute in addition to the vehicle traffic measured value and the atmospheric NOx concentration measured value. In this case, the estimation result data may include an attribute value other than the vehicle traffic measured value and the atmospheric NOx concentration measured value.

The following describes an example where a plurality of tuples of information (i.e. estimation result date) associating a vehicle traffic measured value and an atmospheric NOx concentration measured value, an estimation result (determination result) indicating whether the traffic and NOx concentration measurement point is "urban" or "rural", and information indicating a learning model used when deriving the estimation result are input to the input means 2.

The display means 3 displays a graph representing each estimation result by a symbol, where the type of the symbol is changed depending on the learning model corresponding to the estimation result. The display means 3 represents one tuple of estimation result data by one symbol. This is referred to as "representing an estimation result by a symbol".

FIG. 10 is a schematic diagram depicting an example of the graph displayed by the display means 3 in Exemplary Embodiment 3. As depicted in FIG. 10, the display means 3 displays a scatter graph representing each estimation result by a symbol. The scatter graph displayed in Exemplary Embodiment 3 has an axis corresponding to a first attribute (vehicle traffic in this example) used when deriving the estimation result and an axis corresponding to a second attribute (atmospheric NOx concentration in this example) used when deriving the estimation result. FIG. 10 depicts an example where the axis corresponding to the vehicle traffic is the horizontal axis and the axis corresponding to the atmospheric NOx concentration is the vertical axis.

The display means 3 places the symbol representing each estimation result at the position at which the two types of attribute values included in the estimation result data corresponding to the estimation result are coordinates. In this example, the display means 3 places the symbol representing each estimation result at the position at which the vehicle traffic measured value corresponding to the estimation result is an x coordinate (coordinate in the horizontal axis direction) and the atmospheric NOx measured value corresponding to the estimation result is a y coordinate (coordinate in the vertical axis direction).

The display means 3 changes the type of the symbol representing the estimation result, depending on the estimation result ("urban" or "rural"). The display means 3 also changes the type of the symbol depending on the learning model corresponding to the estimation result. In the example depicted in FIG. 10, the display means 3 uses a circular symbol in the case where the estimation result is "urban", and a cross symbol in the case where the estimation result is "rural". Moreover, the display means 3 displays the symbol as a solid line in the case where the estimation result represented by the symbol corresponds to the learning model 1, and displays the symbol as a dotted line in the case where the estimation result represented by the symbol corresponds to the learning model 2. Thus, in the example depicted in FIG. 10, the display means 3 changes the type of the symbol by two criteria, namely, the type of the estimation result and the type of the learning model corresponding to the estimation result.

In the example depicted in FIG. 10, the symbol shape is changed in the case of changing the type of the symbol depending on the type of the estimation result, and the line type is changed in the case of changing the type of the symbol depending on the type of the learning model corresponding to the estimation result. However, how the type of the symbol is changed in the case of changing the type of the symbol depending on the type of the estimation result or in the case of changing the type of the symbol depending on the type of the learning model corresponding to the estimation result is not particularly limited.

Figure 11:
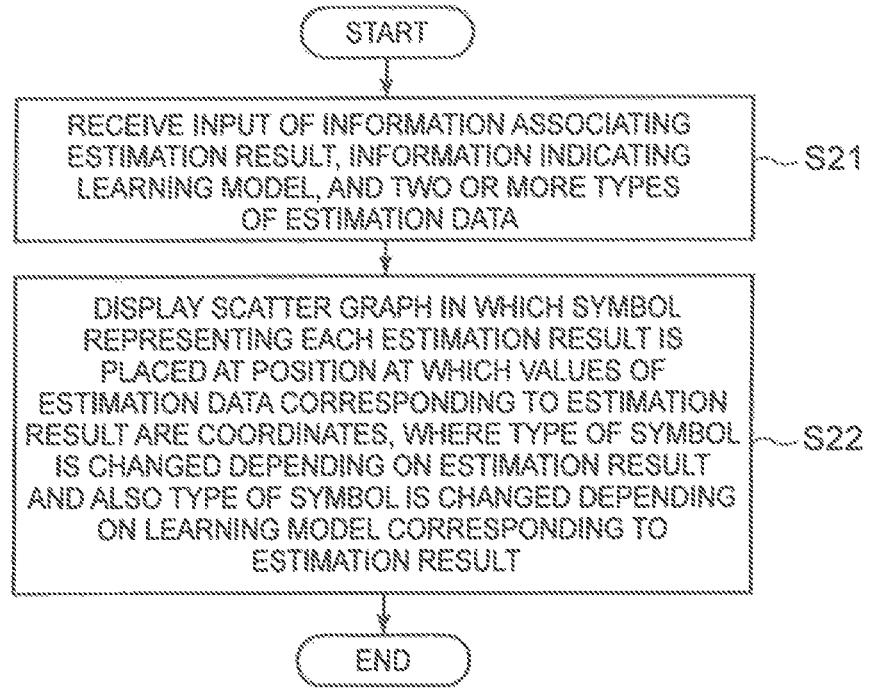
FIG. 11 is a flowchart depicting an example of a process in Exemplary Embodiment 3.

A process is described below. FIG. 11 is a flowchart depicting an example of the process in Exemplary Embodiment 3.

First, the input means 2 receives input of a plurality of tuples of information associating an estimation result, information indicating a learning model used when deriving the estimation result, and two or more types of attributes used when deriving the estimation result. The input means 2 sends the input information to foe display means 3 (step S21).

The display means 3 displays a scatter graph in which a symbol representing each estimation result is placed at the position at which the two types of attribute values corresponding to the estimation result are coordinates, where the type of the symbol is changed depending on the estimation result and also the type of the symbol is changed depending on the learning model corresponding to the estimation result (step S22). For example, the display means 3 displays the scatter graph depicted in FIG. 10.

In Exemplary Embodiment 3, too, the display means 3 changes the type of the symbol representing the estimation result depending on the learning model corresponding to the estimation result. This enables the observer of the scatter graph to intuitively recognize at a glance which learning model is selected when deriving the estimation result represented by the symbol in the scatter graph, from one scatter graph.

In addition, the observer can recognize at a glance the tendency of each learning model, from the scatter graph depicted in FIG. 10. For example, the observer can recognize at a glance that the learning model 1 tends to be selected in the ease where the atmospheric NOx concentration is high with respect to the vehicle traffic and the learning model 2 tends to be selected in the ease where the atmospheric NOx concentration is low with respect to the vehicle traffic, from the scatter graph depicted in FIG. 10. The observer can also recognize at a glance, for example, that the learning model 2 tends to determine the measurement point as "rural" on the whole.

Exemplary Embodiment 4

Figure 12:
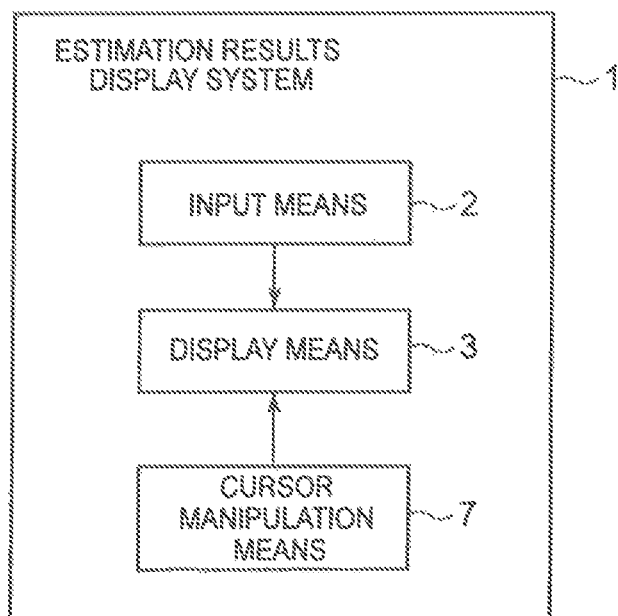
FIG. 12 is a block diagram depicting an example of a structure in Exemplary Embodiment 4 of the present invention.

FIG. 12 is a block diagram depicting an example of a structure in Exemplary Embodiment 4 of the present invention. An estimation results display system 1 in Exemplary Embodiment 4 includes input means 2, display means 3, and cursor manipulation means 7. The description of the same matters as in Exemplary Embodiment 1 is omitted as appropriate.

The input means 2 in Exemplary Embodiment 4 receives input of a plurality of tuples of information associating an estimation result and information indicating a learning model used when deriving the estimation result, as in Exemplary Embodiment 1. The input means 2 sends the input information to the display means 3, The following describes an example where the estimation result is calculated as a value.

The cursor manipulation means 7 is a device used by the observer of a graph (hereafter simply referred to as "observer") to manipulate a cursor on the display screen of the graph. In detail, the cursor manipulation means 7 is a pointing device such as a mouse, a touchpad, a joystick, or a trackball.

Figure 13:
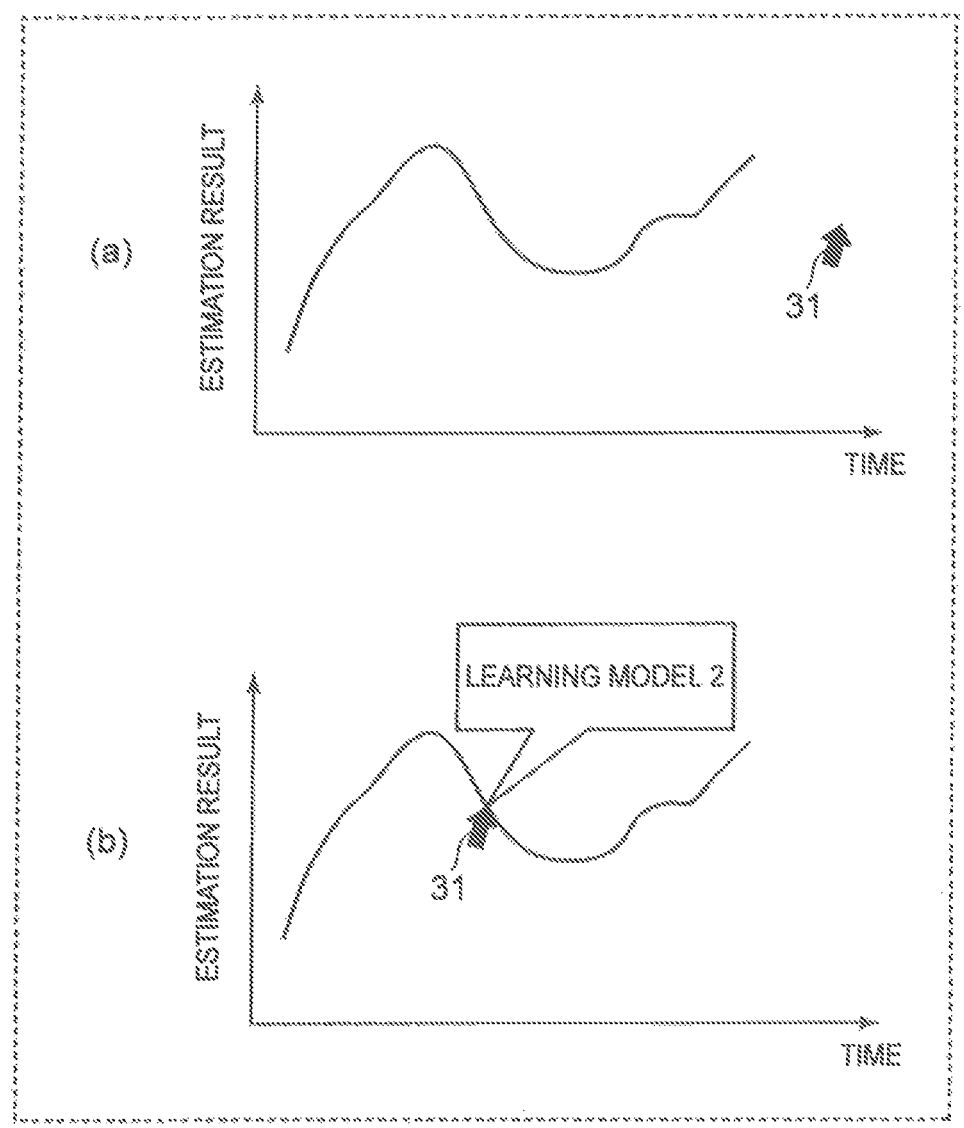
FIG. 13 is a schematic diagram depicting an example of a graph displayed by display means 3 in Exemplary Embodiment 4.

The display means 3 displays a graph representing each estimation result by a symbol. FIG. 13 is a schematic diagram depicting an example of the graph displayed by the display means 3 is Exemplary Embodiment 4. FIG. 13(*a*) depicts the displayed graph in its initial state. FIG. 13(*b*) depicts the graph in the case where a symbol representing an estimation result is pointed and clicked.

The horizontal axis of the graph in this exemplary embodiment is an axis representing the order of the estimation results. FIG. 13 depicts an example where the horizontal axis of the graph represents time. In this case, each estimation result input to the input means 2 may be accompanied with the corresponding time information. Alternatively, each pair of an estimation result and information indicating a learning model may be input to the input means 2 in order of the time corresponding to the estimation result.

The horizontal axis of the graph need not necessarily be an axis representing time, and may be, for example, an axis representing the input order of each pair of an estimation result and information indicating a learning model.

The vertical axis of the graph is an axis corresponding to the estimation result.

The display means 3 displays the graph in which the symbol representing each estimation result is arranged in predetermined order (in order of the time corresponding to the estimation result in this example). In more detail, the display means 3 arranges the symbol representing each estimation result in predetermined order (in order of the time corresponding to the estimation result in this example) along the horizontal axis, and sets the estimation result calculated as a value to be a coordinate in the vertical axis direction is the graph. In other words, the display means 3 places the symbol representing each estimation result at the position at which the ordinal position (e.g. the ordinal position indicated by time) of the estimation result is an x coordinate (coordinate in the horizontal axis direction) and the estimation result is a y coordinate (coordinate in the vertical axis direction). The graph displayed in this way can be recognized as a line graph if the interval between symbols arranged in order is short. FIG. 13 depicts an example where the graph is recognized as a line graph as the interval between symbols arranged in order is short.

The operation of foe display means 3 described here is the same as the operation of the display means 3 in Exemplary Embodiment 1. In Exemplary Embodiment 4, however, the display means 3 uses a common type for all symbols unlike in Exemplary Embodiment 1.

Moreover, in Exemplary Embodiment 4, the display means 3 displays a cursor 31 together with the graph. FIG. 13(*a*) depicts the initial state where the cursor 31 is displayed together with the graph.

The display means 3 changes the display position of the cursor 31 according to the movement of the cursor manipulation means 7 manipulated by the observer. When any of the symbols in the graph is pointed and clicked, the display means 3 displays, in the graph, information indicating the learning model corresponding to the estimation result represented by the symbol. FIG. 13(*b*) depicts this display state of the graph.

Although the following describes an example where, when any symbol is pointed and clicked, the display means 3 displays information indicating the learning model corresponding to the estimation result represented by the symbol in the graph, the display means 3 may, when any symbol is in an on cursor state, display information indicating the learning model corresponding to the estimation result represented by the symbol in the graph.

The expression "a symbol is pointed and clicked" means that the cursor 31 is placed over the symbol and clicking is performed. The expression "a symbol is in an on cursor state" means that the cursor 31 is placed over the symbol.

Figure 14:
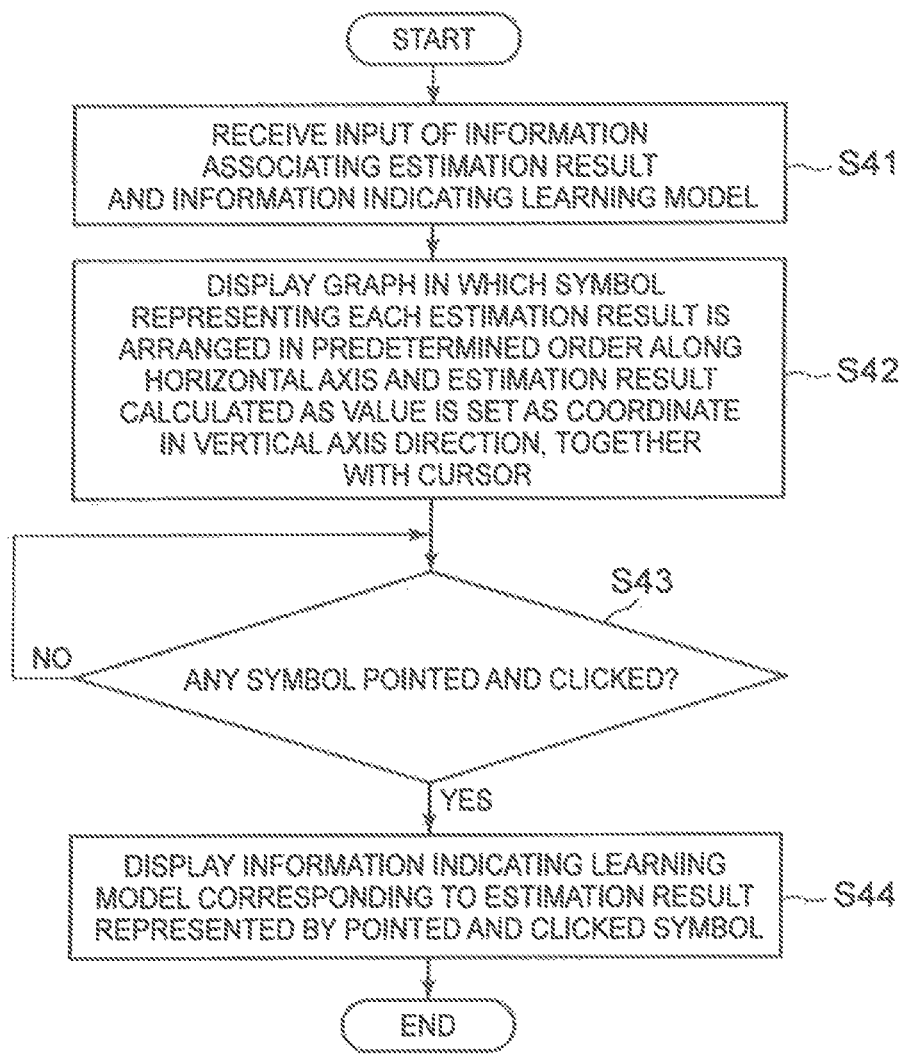
FIG. 14 is a flowchart depicting an example of a process in Exemplary Embodiment 4.

A process is described below. FIG. 14 is a flowchart depicting an example of the process in Exemplary Embodiment 4.

First, the input means 2 receives input of a plurality of triples of information associating an estimation result and information indicating a learning model used when deriving the estimation result. The input means 2 sends the input information to the display means 3 (step S41). Step S41 is the same as step S1 in Exemplary Embodiment 1.

The display means 3 displays a graph hi which a symbol representing each estimation result is arranged in predetermined order along the horizontal axis and the estimation result calculated as a value is set as a coordinate in the vertical axis direction, together with the cursor 31 (step S42). In step S42, the screen depicted in FIG. 13(*a*) is displayed.

The display means 3 then determines whether or not any symbol in the graph is pointed and clicked (step S43). If no symbol is pointed and clicked (step S43: No), the display means 3 repeats the determination in step S43.

In the case where any symbol is pointed and clicked (step S43: Yes), the display means 3 displays information indicating the learning model corresponding to the estimation result represented by the symbol (step S44). In step S44, the screen depicted in FIG. 13(*b*) is displayed. In the example depicted in FIG. 13(*b*), a symbol representing an estimation result derived using "learning model 2" is pointed and clicked, and information indicating "learning model 2" is displayed.

After step S44, in the case where the cursor 31 moves away from the symbol, the display means 3 may repeat the operation from step S43 onward.

According to this exemplary embodiment, in the case where any of the symbols representing the estimation results is pointed and clicked (or is in an on cursor state), the display means 3 displays information indicating the learning model corresponding to the estimation result represented by the symbol. This enables the observer to intuitively recognize at a glance which learning model is selected when deriving the estimation result represented by the symbol, from one graph.

The following describes Modification 1 of Exemplary Embodiment 4.

Figure 15:
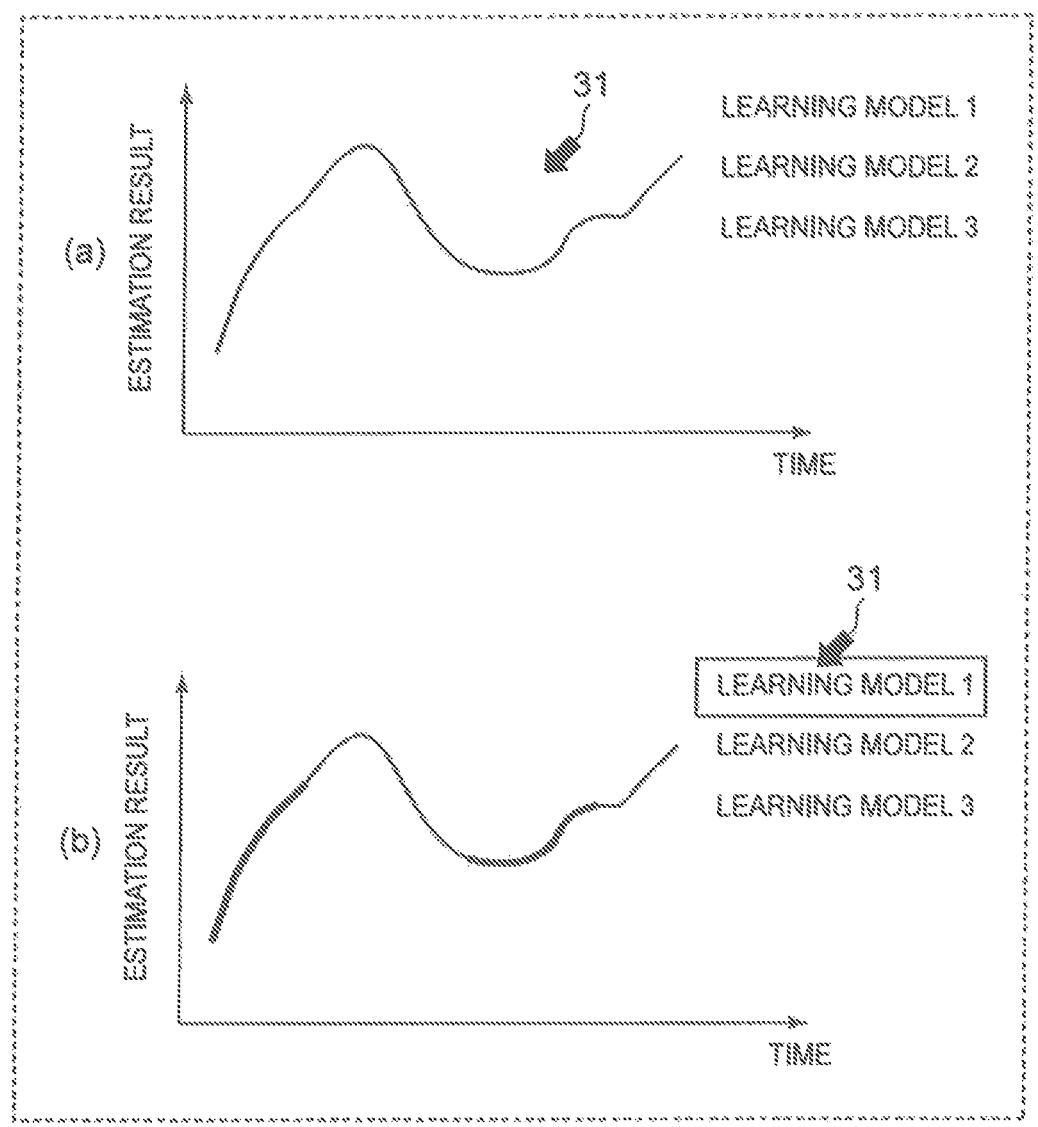
FIG. 15 is a schematic diagram depicting a graph in Modification 1 of Exemplary Embodiment 4.

FIG. 15 is a schematic diagram depicting a graph in Modification 1 of Exemplary Embodiment 4. In this modification, the display means 3 displays the cursor 31 together with the graph. The display means 3 also displays legends indicating a plurality of learning models. FIG. 15(*a*) depicts the initial state where the cursor 31 is displayed together with the graph.

The display means 3 changes the display position of the cursor 31 according to the movement of the cursor manipulation means 7 manipulated by the observer. When a specific learning model is pointed and clicked from among the plurality of learning models indicated by the legends displayed near the graph, the display means 3 highlights a symbol representing each estimation result derived using the learning model. In other words, the display means 3 displays the graph in which the display mode (type) is changed between the symbol representing the estimation result corresponding to the pointed and clicked learning model and the other symbols. FIG. 15(*b*) depicts an example of this display state of the graph. The designation of the learning model need not necessarily be performed by point and click. As an example, the observer may designate the specific learning model by inputting a command via a command line. As another example, the observer may select the specific learning model via an interface such as a pull-down menu or a radio button.

The following describes Modification 2 of Exemplary Embodiment 4.

Figure 16:
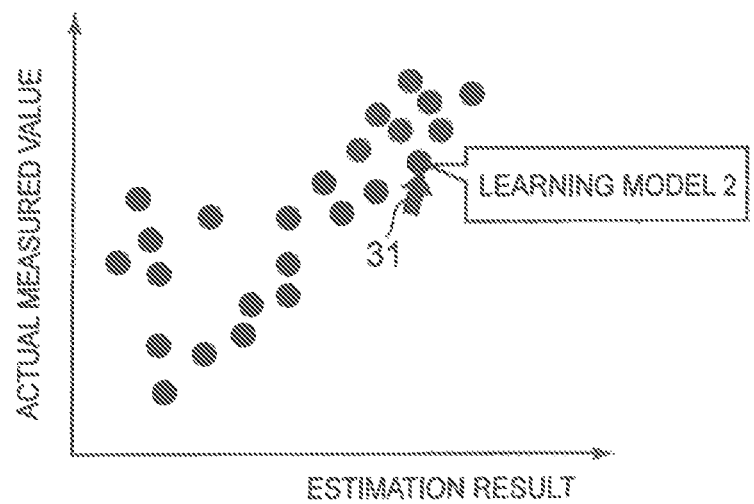
FIG. 16 is a schematic diagram depicting a graph in Modification 2 of Exemplary Embodiment 4.

The display means 3 may display a graph (scatter graph) depicted in FIG. 16, as the graph. In this case, the input means 2 receives input of the same information as in Exemplary Embodiment 2. The display means 3 may determine the placement position of each symbol in the scatter graph in the same way as in Exemplary Embodiment 2. Here, the display device 3 uses a common type for all symbols. In the case where any symbol is pointed and clicked (or is in an on cursor state), the display means 3 displays information indicating the learning model corresponding to the estimation result represented by the symbol (see FIG. 16). When the cursor 31 is away from the symbol, the display means 3 does not display the information indicating the learning model.

The following describes Modification 3 of Exemplary Embodiment 4.

Figure 17:
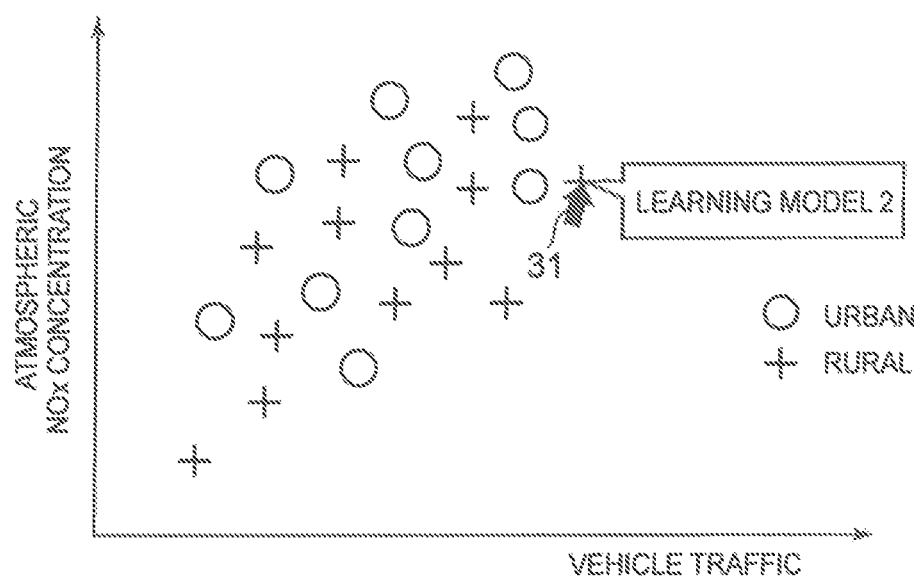
FIG. 17 is a schematic diagram depicting a graph in Modification 3 of Exemplary Embodiment 4.

The display means 3 may display a graph (scatter graph) depicted in FIG. 17, as the graph. In this case, the input means 2 receives input of the same information as in Exemplary Embodiment 3. The display means 3 may determine the placement position of each symbol in the scatter graph in the same way as in Exemplary Embodiment 3. The display means 3 also changes the type of the symbol representing the estimation result depending on the estimation result (e.g. "urban" or "rural"), as in Exemplary Embodiment 3. Here, the display means 3 does not change the type of the symbol based on the learning model corresponding to the estimation result represented by the symbol. In the case where any symbol is pointed and clicked (or is in an on cursor state), the display means 3 displays information indicating the learning model corresponding to the estimation result represented by the symbol (see FIG. 17). When the cursor 31 is away from the symbol, the display means 3 does not display the information indicating the learning model.

These modifications (see FIGS. 15, 16, and 17) of Exemplary Embodiment 4 achieve the same advantageous effects as Exemplary Embodiment 4. The modification depicted in FIG. 16 also achieves the same advantageous effects as Exemplary Embodiment 2.

Exemplary Embodiment 5

An estimation results display system in Exemplary Embodiment 5 of the present invention can be depicted by the block diagram in FIG. 5, as with the estimation results display system in Exemplary Embodiment 1. Hence, Exemplary Embodiment 5 is described below with reference to FIG. 5. The description of the same matters as in Exemplary Embodiment 1 is omitted as appropriate.

The estimation results display system 1 in Exemplary Embodiment 5 includes the input means 2 and the display means 3 (see FIG. 5).

The input means 2 receives input of a plurality of tuples of information associating an estimation result and information indicating a learning model used when deriving the estimation result, as in Exemplary Embodiment 1. The input means 2 sends the input information to the display means 3. An example where the estimation result is calculated as a value is described here.

Figure 18:
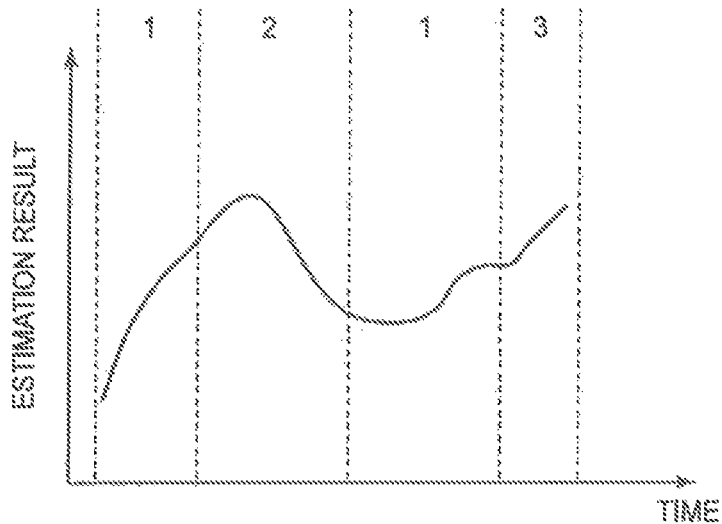
FIG. 18 is a schematic diagram depicting an example of a graph displayed by display means 3 in Exemplary Embodiment 5.

The display means 3 displays a graph representing each estimation result by a symbol. FIG. 18 is a schematic diagram depicting an example of the graph displayed by the display means 3 in Exemplary Embodiment 5.

The horizontal axis of the graph in this exemplary embodiment is an axis representing the order of the estimation results. FIG. 18 depicts an example where the horizontal axis of the graph represents time. In this case, each estimation result input to the input means 2 may be accompanied with the corresponding time information. Alternatively, each pair of an estimation result and information indicating a learning model may be input to the input means 2 in order of the time corresponding to the estimation result.

The horizontal axis of the graph need not necessarily be an axis representing time, and may be, for example, au axis representing the input order of each pair of an estimation result and information indicating a learning model.

The vertical axis of the graph is an axis corresponding to the estimation result.

The display means 3 displays the graph in which the symbol representing each estimation result is arranged in predetermined order (in order of the time corresponding to the estimation result in this example). In more detail, the display means 3 arranges the symbol representing each estimation result in predetermined order (in order of the time corresponding to the estimation result in this example) along the horizontal axis, and sets the estimation result calculated as a value to be a coordinate in the vertical axis direction in the graph. In other words, the display means 3 places the symbol representing each estimation result at the position at which the ordinal position (e.g. the ordinal position indicated by time) of the estimation result is an x coordinate (coordinate in the horizontal axis direction) and the estimation result is a y coordinate (coordinate in the vertical axis direction). The graph displayed in this way ears be recognized as a line graph if the interval between symbols arranged in order is short. FIG. 18 depicts an example where the graph is recognized as a line graph as the internal between symbols arranged in order is short.

The operation of the display means 3 described here is the same as the operation of the display means 3 in Exemplary Embodiment 1. In Exemplary Embodiment 5, however; the display means 3 uses a common type for ail symbols unlike in Exemplary Embodiment 1.

In Exemplary Embodiment 5, the display means 3 divides the region in the graph depending on the learning model corresponding to the estimation result represented by each symbol. This operation is described below.

The symbols are arranged in the horizontal axis direction. In the case where the learning models corresponding to the estimation results represented by two symbols adjacent in the horizontal axis direction are different, the display means 3 displays a boundary line perpendicular to the horizontal axis between the two symbols. For example, suppose a learning model corresponding to an estimation result represented by a symbol (denoted by A) is "learning model 1", and a learning model corresponding to an estimation result represented by a symbol (denoted by B) following the symbol A is "learning model 2". In this ease, the display means 3 displays a boundary line perpendicular to the horizontal axis between the symbols A and B. In FIG. 18, each boundary line is indicated by a dashed line.

The display means 3 may also display a boundary line near a symbol which is an endpoint (see FIG. 18).

The symbols in each region defined by adjacent two boundary lines represent estimation results derived using a common learning model. Thus, each region defined by adjacent two boundary lines corresponds to one learning model. The display means 3 displays each region defined by adjacent two boundary lines, in a mode associated with the learning model corresponding to the region. In the example depicted in FIG. 18, the display means 3 displays, in each region defined by adjacent two boundary lines, an identification number for identifying the learning model corresponding to the region. The graph in FIG. 18 includes four regions each of which is defined by adjacent two boundary lines, and these regions correspond to "learning model F", "learning model 2", "learning model 1", and "learning model 3" from left to right.

Alternatively, the display means 3 may display each region defined by adjacent two boundary lines, in a background color associated with the learning model corresponding to the region. For example, the display means 3 may present the learning model corresponding to each region by setting the background color of the region corresponding to "learning model 1" to red and the background color of the region corresponding to "learning model 2" to blue.

How the display mode of each individual region is changed depending on the type of the learning model is not particularly limited.

Figure 19:
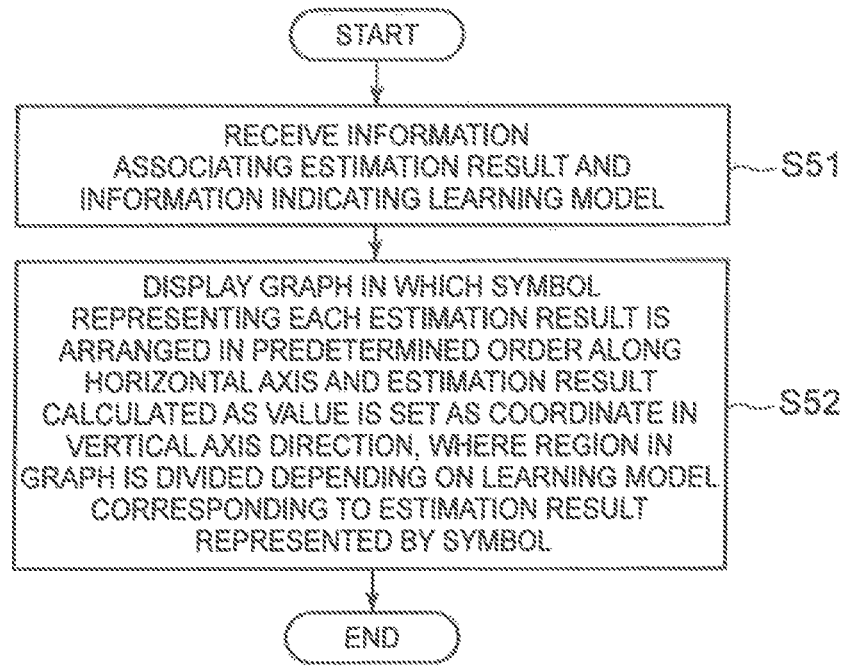
FIG. 19 is a flowchart depicting an example of a process in Exemplary Embodiment 5.

A process is described below. FIG. 19 is a flowchart depicting an example of the process in Exemplary Embodiment 5.

First, the input means 2 receives input of a plurality of tuples of information associating an estimation result and information indicating a learning model used when deriving the estimation result. The input means 2 sends the input information to the display means 3 (step S51). Step S51 is the same as step S1 in Exemplary Embodiment 1.

The display means 3 displays a graph in which a symbol representing each estimation result is arranged in predetermined order along the horizontal axis and the estimation result calculated as a value is set as a coordinate in the vertical axis direction, where the region in the graph is divided depending on the learning model corresponding to the estimation result represented by each symbol (step S52). In step S52, the screen depicted in FIG. 18 is displayed. The method of dividing the region in the graph is not particularly limited. For example, the display means 3 may divide the region in the graph by changing the color or pattern for each region.

According to this exemplary embodiment, the display means 3 displays the graph whose region is divided depending on the learning model corresponding to the estimation result represented by each symbol. This enables the observer to intuitively recognize at a glance which learning model is selected when deriving the estimation result represented by the symbol, from one graph.

The following describes a modification of Exemplary Embodiment 5.

Figure 20:
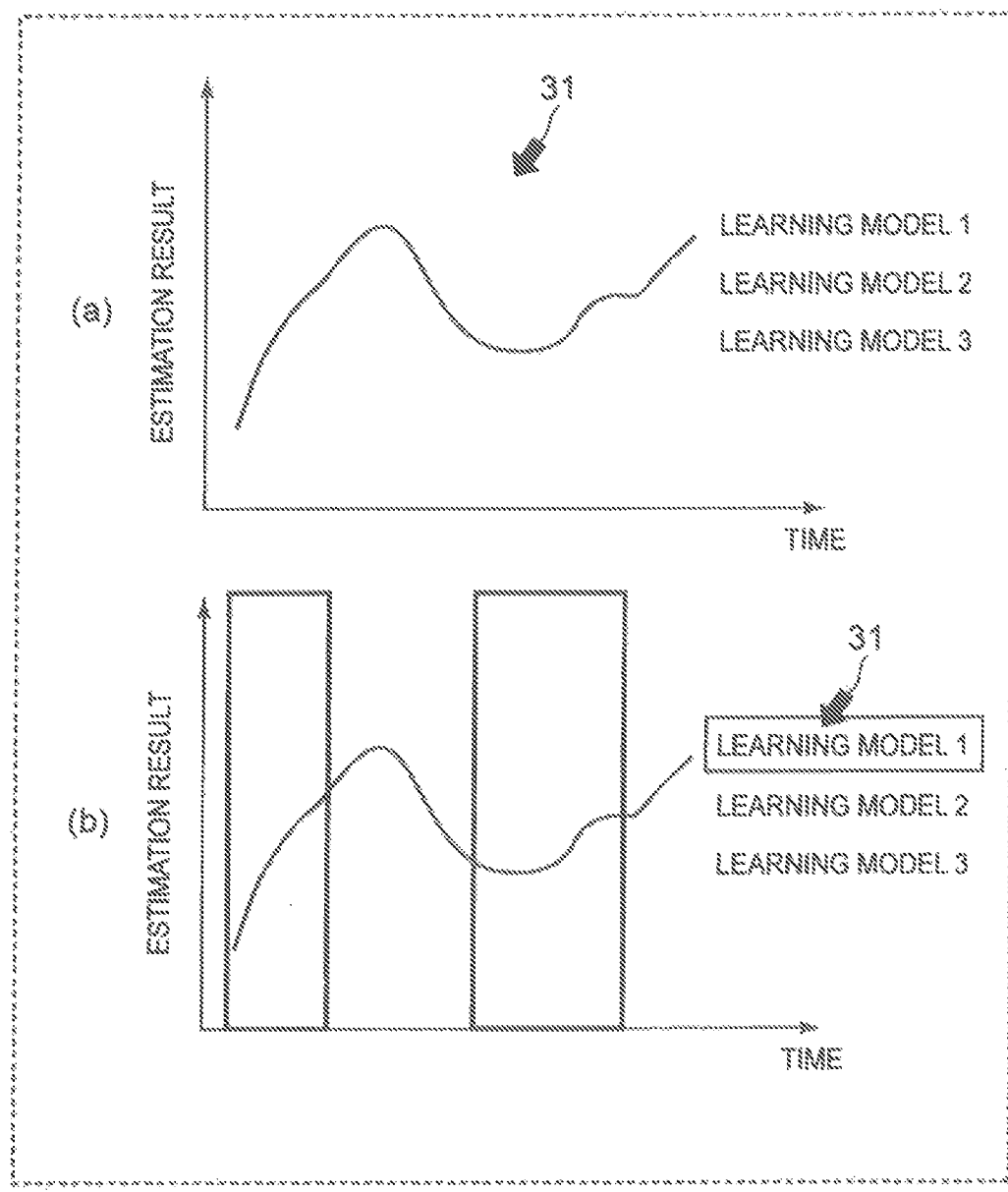
FIG. 20 is a schematic diagram depicting a graph in a modification of Exemplary Embodiment 5.

FIG. 20 is a schematic diagram depicting a graph in the modification of Exemplary Embodiment 5. The display means 3 displays the cursor 31 together with the graph. FIG. 20(a) depicts the initial state where the cursor 31 is displayed together with the graph. In this modification, the estimation results display system 1 also includes the cursor manipulation means 7.

The display means 3 changes the display position of the cursor 31 according to the movement of the cursor manipulation means 7 manipulated by the observer. When a specific learning model is pointed and clicked from among the plurality of learning models indicated by the legends displayed near the graph, the display means 3 highlights a region in the graph in which an estimation result derived using the learning model is displayed. FIG. 20(b) depicts an example of this display state of the graph. In the example in FIG. 20(b), the region in the graph is highlighted by being enclosed with a rectangle. The designation of the learning model need not necessarily be performed by point and click. As an example, the observer may designate the specific learning model by inputting a command via a command line. As another example, the observer may select the specific learning model via an interlace snub as a pull-down menu or a radio button.

Exemplary Embodiment 6

Figure 21:
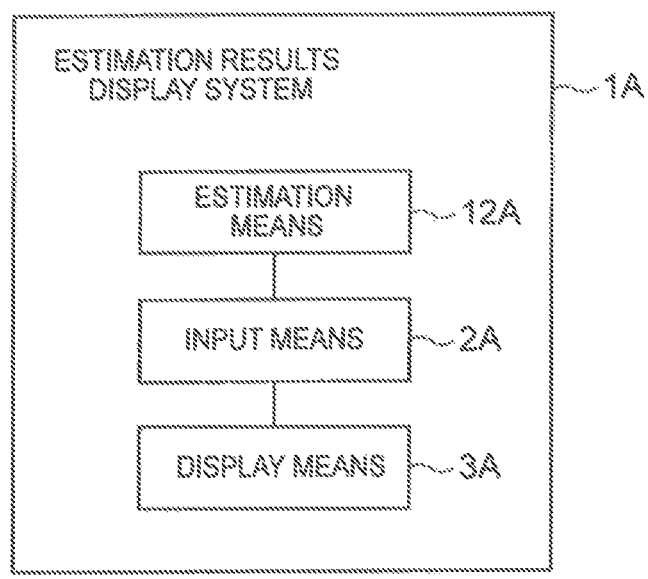
FIG. 21 is a block diagram depicting an example of the structure of an estimation results display system in Exemplary Embodiment 6 of the present invention.

FIG. 21 is a block diagram depicting an example of the structure of an estimation results display system in Exemplary Embodiment 6 of the present invention. An estimation results display system 1A includes estimation means 12A, input means 2A, and display means 3A.

The estimation means 12A selects a learning model corresponding to a condition satisfied by estimation data from among a plurality of learning models. The estimation means 12A then derives an estimation result based on the estimation data and the selected learning model. The estimation means 12A outputs information associating the estimation result and information indicating the learning model used when deriving the estimation result.

The input means 2A receives input of the information associating the estimation result and the information indicating the learning model used when deriving the estimation result. The input means 2A may also receive input of information in which an actual value corresponding to the estimation result or estimation data used when deriving the estimation result is further associated.

The display means 3A displays a graph representing each estimation result by a symbol, where the type of the symbol is changed depending on the learning model corresponding to the estimation result. For example, the display means 3A performs the operation described in any of Exemplary Embodiments 1 to 6 and their modifications. The estimation results display system 1A may include the cursor manipulation means 7.

Figure 22:
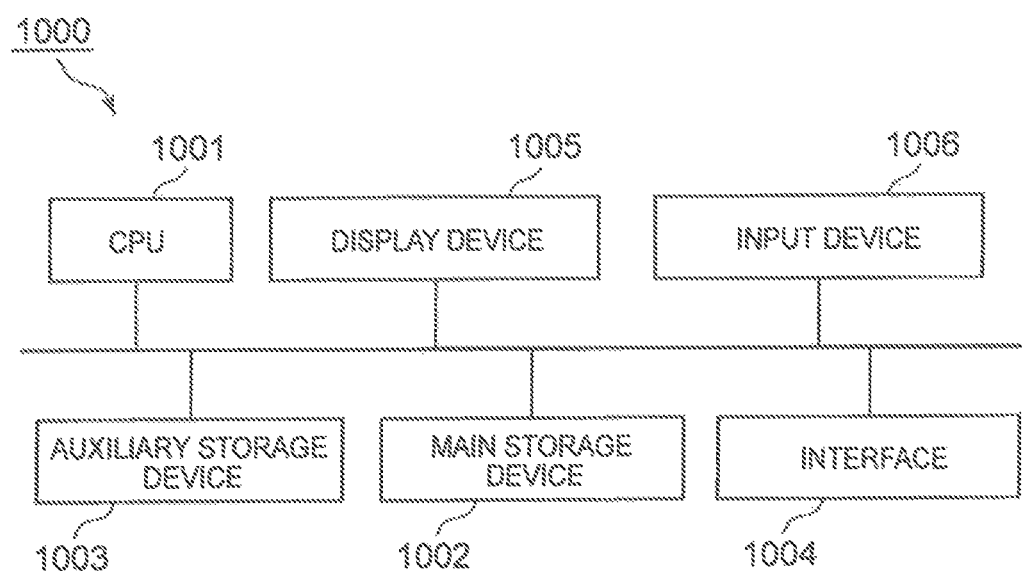
FIG. 22 is a schematic block diagram depicting an example of the structure of a computer according to each exemplary embodiment of the present invention.

FIG. 22 is a schematic block diagram depicting an example of the structure of a computer according to each exemplary embodiment of the present invention. A computer 1000 includes a CPU 1001, a main storage device 1002, an auxiliary storage device 1003, an interface 1004, a display device 1005, and an input device 1006.

The estimation results display system 1 in each exemplary embodiment is implemented by the computer 1000. The operation of the estimation results display system 1 is stored in the auxiliary storage device 1003 in the form of a program (estimation results display program). The CPU 1001 reads the program from the auxiliary storage device 1003, expands the program in the main storage device 1002, and executes the aforementioned process according to the program.

The auxiliary storage device 1003 is an example of a non-transitory tangible medium. Examples of the non-transitory tangible medium include a magnetic disk, magneto-optical disk, CD-ROM, DVD-ROM, and semiconductor memory connected via the interface 1004. In the case where the program is distributed to the computer 1000 through a communication line, the computer 1000 to which the program has been distributed may expand the program in the main storage device 1002 and execute the aforementioned process.

The program may realize part of the aforementioned process. The program may be a differential program that realizes the aforementioned process in combination with another program already stored in the auxiliary storage device 1003.

For example, Exemplary Embodiment 1 or 4 may be described as follows. In Exemplary Embodiment 1 or 4, the input means 2 receives input of information associating an estimation result and information indicating a learning model used when deriving the estimation result. The display means 3 displays a line graph representing the changes of the estimation result, where the attribute of the line is changed depending on the learning model corresponding to the estimation result.

The changes of the estimation result are, for example, the time-series changes of the estimation result. The attribute of the line is, for example, the appearance of the line such as line color or line type (e.g. solid line, dotted line, dashed-dotted line, etc.). The attribute of the line is not limited to the appearance of the line. The display means 3 may display information indicating the learning model corresponding to the line when the line is pointed and clicked.

The foregoing exemplary embodiments can be described as, but not limited to, the following supplementary notes.

Supplementary Note 1

An estimation results display system including: input means for receiving input of information associating an estimation result and information indicating a learning model used when deriving the estimation result; and display means for displaying a graph that represents the estimation result by a symbol and in which a type of the symbol is changed depending on the learning model corresponding to the estimation result.

Supplementary Note 2

The estimation results display system according to Supplementary note 1, wherein the display means displays the graph that represents a value of the estimation result by a coordinate at which the symbol is located.

Supplementary Note 3

The estimation results display system according to Supplementary note 1 or 2, wherein the input means receives input of a set of estimation result data which is information associating a value of the estimation result, the information indicating the learning model used when deriving the estimation result, and an actual measured value corresponding to the estimation result, and wherein the display means displays a scatter graph that has an axis corresponding to the value of the estimation result and an axis corresponding to the actual measured value and in which the symbol corresponding to the estimation result data is placed based on the value of the estimation result and the actual measured value corresponding to the estimation result data.

Supplementary Note 4

The estimation results display system according to Supplementary note 1, wherein the display means displays the graph that represents the estimation result by the type of the symbol.

Supplementary Note 5

The estimation results display system according to Supplementary note 4, wherein the input means receives input of a set of estimation result data which is information associating the estimation result, values of at least two types of attributes used when deriving the estimation result, and the information indicating the learning model used when deriving the estimation result, and wherein the display means displays a scatter graph that has an axis corresponding to a value of a first attribute of the attributes and an axis corresponding to a value of a second attribute of the attributes and in which the symbol corresponding to the estimation result data is placed based on the value of the first attribute and the value of the second attribute corresponding to the estimation result data.

Supplementary Note 6

The estimation results display system according to Supplementary note 1, wherein the input means receives input of a set of estimation result data which is a tuple of information associating the estimation result and the information indicating the learning model used when deriving the estimation result, and wherein the display means selects, for each triple of estimation result data, the type of the symbol representing the tuple of estimation result data depending on the learning model corresponding to the tuple of estimation result data, and displays the graph that represents, by the selected symbol, the estimation result corresponding to the tuple of estimation result data.

Supplementary Note 7

An estimation results display system including: input means for receiving input of information associating an estimation result and information indicating a learning model used when deriving the estimation result; and display means for displaying a graph that represents the estimation result by a symbol and, in the case where any symbol in the graph is selected, displaying information indicating a learning model corresponding to an estimation result represented by the selected symbol.

Supplementary Note 8

An estimation results display system including: input means for receiving input of information associating an estimation result and information indicating a learning model used when deriving the estimation result; and display means for displaying a graph in which a symbol representing the estimation result is arranged in predetermined order, a region in the graph being divided depending on the learning model corresponding to the estimation result represented by the symbol.

Supplementary Note 9

An estimation results display system including: input means for receiving input of information associating an estimation result and information indicating a learning model used when deriving the estimation result; and display means for displaying a line graph that represents a change of the estimation result and in which an attribute of a line is changed depending on the learning model corresponding to the estimation result.

Supplementary Note 10

The estimation results display system according to any of Supplementary notes 1 to 9, wherein the estimation result received by the input means is derived using estimation data and the learning model selected depending on the estimation data.

Supplementary Note 11

The estimation results display system according to any of Supplementary notes 1 to 10, further including estimation means for selecting the learning model corresponding to a condition satisfied by estimation data from among a plurality of learning models, deriving the estimation result based on the estimation data and the selected learning model, and outputting the information associating the estimation result and the information indicating the learning model used when deriving the estimation result, wherein the input means receives the information output by the estimation means.

Supplementary Note 12

An estimation results display method including: receiving input of information associating an estimation result and information indicating a learning model used when deriving the estimation result; and displaying a graph that represents the estimation result by a symbol and in which a type of the symbol is changed depending on the learning model corresponding to the estimation result.

Supplementary Note 13

An estimation results display method including: receiving input of information associating an estimation result and information indicating a learning model used when deriving the estimation result; and displaying a graph that represents the estimation result by a symbol and, in the case where any symbol in the graph is selected, displaying information indicating a learning model corresponding to an estimation result represented by the selected symbol.

Supplementary Note 14

An estimation results display method including: receiving input of information associating an estimation result and information indicating a learning model used when deriving the estimation result; and displaying a graph in which a symbol representing the estimation result is arranged in predetermined order, a region in the graph being divided depending on the learning model corresponding to the estimation result represented by the symbol.

Supplementary Note 15

An estimation results display method including: receiving input of information associating an estimation result and information indicating a learning model used when deriving the estimation result: and displaying a line graph that represents a change of the estimation result and in which an attribute of a line is changed depending on the learning model corresponding to the estimation result.

Supplementary Note 16

An estimation results display program provided in a computer including input means for receiving input of information associating an estimation result and information indicating a learning model used when deriving the estimation result, the estimation results display program causing dm computer to execute a display process of displaying a graph that represents the estimation result by a symbol and in which a type of the symbol is changed depending on the learning model corresponding to the estimation result.

Supplementary Note 17

An estimation results display program provided in a computer including input means for receiving input of information associating an estimation result and information indicating a learning model used when deriving the estimation result, the estimation results display program causing the computer to execute a display process of displaying a graph that represents the estimation result by a symbol and, in the case where any symbol in the graph is selected, displaying information indicating a learning model corresponding to an estimation result represented by the selected symbol.

Supplementary Note 18

An estimation results display program provided in a computer including input means for receiving input of information associating an estimation result and information indicating a learning model used when deriving the estimation result, the estimation results display program causing the computer to execute a display process of displaying a graph in which a symbol representing the estimation result is arranged in predetermined order, a region in the graph being divided depending on the learning model corresponding to the estimation result represented by the symbol.

Supplementary Note 19

An estimation results display program provided in a computer including input means for receiving input of information associating an estimation result and information indicating a learning model used when deriving the estimation result, the estimation results display program causing the computer to execute a display process of displaying a line graph that represents a change of the estimation result and in which an attribute of a line is changed depending on the learning model corresponding to the estimation result.

Although the present invention has been described with reference to the exemplary embodiments, the present invention is not limited to the foregoing exemplary embodiments. Various changes understandable by those skilled in the art can be made to the structures and details of the present invention within the scope of the present invention.

This application claims priority based on Japanese Patent Application No. 2014-214561 filed on Oct. 21, 2014, the disclosure of which is incorporated herein in its entirety.

INDUSTRIAL APPLICABILITY

The present invention is suitably applied to an estimation results display system that selects a learning model and displays an estimation result derived using the learning model.

REFERENCE SIGNS LIST 1 estimation results display system
2 input means
3 display means
7 cursor manipulation means

The invention claimed is:

1. An estimation results display system comprising:
an input unit, implemented by an input device, for receiving input of an estimation result data set including information associated with an estimation result and information indicating a learning model used when deriving the estimation result;
an estimation unit, implemented by the processor, for selecting the learning model based on at least one attribute value included in the input estimation result data set; and
a display unit, implemented by a processor and a display device, for displaying a graph that represents the estimation result by a symbol and, in the case where any symbol in the graph is selected, displaying information indicating a learning model corresponding to an estimation result represented by the selected symbol;
wherein the estimation result received by the input unit is derived using estimation data and the learning model selected depending on a selection model being a tree structure model in which each leaf node is a learning model and each node other than the leaf nodes is a condition relating to the estimation data.

2. The estimation results display system according to claim 1, wherein the estimation result received by the input unit is derived using estimation data and the learning model selected depending on the estimation data.

3. The estimation results display system according to claim 1, further comprising an estimation unit, implemented by the processor, for selecting the learning model corresponding to a condition satisfied by estimation data from among a plurality of learning models, deriving the estimation result based on the estimation data and the selected learning model, and outputting the information associating the estimation result and the information indicating the learning model used when deriving the estimation result, wherein the input unit receives the information output by the estimation unit.

4. The estimation results display system according to claim 1, wherein the display unit displays the graph that represents a value of the estimation result by a coordinate at which the symbol is located.

5. The estimation results display system according to claim 1, wherein the input unit receives input of a set of estimation result data which is information associating a value of the estimation result, the information indicating the learning model used when deriving the estimation result, and an actual measured value corresponding to the estimation result, and
wherein the display unit displays a scatter graph that has an axis corresponding to the value of the estimation result and an axis corresponding to the actual measured value and in which the symbol corresponding to the estimation result data is placed based on the value of the estimation result and the actual measured value corresponding to the estimation result data.

6. The estimation results display system according to claim 1, wherein the display unit displays the graph that represents the estimation result by a type of the symbol.

7. The estimation results display system according to claim 6, wherein the input unit receives input of a set of estimation result data which is information associating the estimation result, values of at least two types of attributes used when deriving the estimation result, and the information indicating the learning model used when deriving the estimation result, and
wherein the display unit displays a scatter graph that has an axis corresponding to a value of a first attribute of the attributes and an axis corresponding to a value of a second attribute of the attributes and in which the symbol corresponding to the estimation result data is placed based on the value of the first attribute and the value of the second attribute corresponding to the estimation result data.

8. The estimation results display system according to claim 1, wherein the display unit groups learning models and displays a line graph that represents a change of the estimation result and in which an attribute of a line is changed depending on each learning model group.

9. An estimation results display method comprising:
receiving input of an estimation result data set including information associated with an estimation result and information indicating a learning model used when deriving the estimation result;
selecting the learning model based on at least one attribute value included in the input estimation result data set; and
displaying a graph that represents the estimation result by a symbol and, in the case where any symbol in the graph is selected, displaying information indicating a learning model corresponding to an estimation result represented by the selected symbol;
wherein the estimation result that is received is derived using estimation data and the learning model selected depending on a selection model being a tree structure model in which each leaf node is a learning model and each node other than the leaf nodes is a condition relating to the estimation data.

10. A non-transitory computer-readable recording medium in which an estimation results display program is recorded, the estimation results display program provided in a computer including an input unit for receiving input of an estimation result data set including information associated with an estimation result and information indicating a learning model used when deriving the estimation result, the computer including an estimation unit for selecting the learning model based on at least one attribute value included in the input estimation result data set, the estimation results display program causing the computer to execute a display process of displaying a graph that represents the estimation result by a symbol and, in the case where any symbol in the graph is selected, displaying information indicating a learning model corresponding to an estimation result represented by the selected symbol;
wherein the estimation result received by the input unit is derived using estimation data and the learning model selected depending on a selection model being a tree structure model in which each leaf node is a learning model and each node other than the leaf nodes is a condition relating to the estimation data.

11. An estimation results display system comprising:
an input unit, implemented by an input device, for receiving input of an estimation result data set including information associated with an estimation result and information indicating a learning model used when deriving the estimation result;

an estimation unit, implemented by the processor, for selecting the learning model based on at least one attribute value included in the input estimation result data set; and a display unit, implemented by a processor and a display device, for displaying a graph that represents the estimation result by a symbol and, in the case where any of a plurality of learning models is selected, displaying a symbol representing an estimation result derived using the selected learning model in a mode different from other symbols;

wherein the estimation result received by the input unit is derived using estimation data and the learning model selected depending on a selection model being a tree structure model in which each leaf node is a learning model and each node other than the leaf nodes is a condition relating to the estimation data.

12. An estimation results display method comprising:

selecting a learning model based on at least one attribute value included in an input estimation data set;

receiving input of the estimation result data set including information associated with an estimation result and information indicating the learning model used when deriving the estimation result; and displaying a graph that represents the estimation result by a symbol and, in the case where any of a plurality of learning models is selected, displaying a symbol representing an estimation result derived using the selected learning model in a mode different from other symbols;

wherein the estimation result that is received is derived using estimation data and the learning model selected depending on a selection model being a tree structure model in which each leaf node is a learning model and each node other than the leaf nodes is a condition relating to the estimation data.

13. A non-transitory computer-readable recording medium in which an estimation results display program is recorded, the estimation results display program provided in a computer including an input unit for receiving input of an estimation result data set including information associated with an estimation result and information indicating a learning model used when deriving the estimation result, the computer including an estimation unit for selecting the learning model based on at least one attribute value included in the input estimation result data set, the estimation results display program causing the computer to execute a display process of displaying a graph that represents the estimation result by a symbol and, in the case where any of a plurality of learning models is selected, displaying a symbol representing an estimation result derived using the selected learning model in a mode different from other symbols;

wherein the estimation result received by the input unit is derived using estimation data and the learning model selected depending on a selection model being a tree structure model in which each leaf node is a learning model and each node other than the leaf nodes is a condition relating to the estimation data.

* * * * *